United States Patent
Still

(10) Patent No.: US 10,264,419 B2
(45) Date of Patent: Apr. 16, 2019

(54) CONTROLLING VEHICLE CABIN NETWORKS BASED ON CONNECTIVITY METRICS

(71) Applicant: Thales Avionics, Inc., Irvine, CA (US)

(72) Inventor: Brian A. Still, Melbourne, FL (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 15/976,016

(22) Filed: May 10, 2018

(65) Prior Publication Data

US 2018/0262885 A1    Sep. 13, 2018

Related U.S. Application Data

(63) Continuation of application No. 15/234,788, filed on Aug. 11, 2016, now Pat. No. 10,009,735.

(51) Int. Cl.
| | |
|---|---|
| *H04W 76/18* | (2018.01) |
| *H04W 4/30* | (2018.01) |
| *H04W 4/33* | (2018.01) |
| *H04B 17/345* | (2015.01) |
| *H04L 12/26* | (2006.01) |
| *H04W 24/08* | (2009.01) |
| *H04L 29/08* | (2006.01) |
| *H04W 8/22* | (2009.01) |
| *H04W 12/08* | (2009.01) |

(Continued)

(52) U.S. Cl.
CPC ............ *H04W 4/30* (2018.02); *H04B 17/345* (2015.01); *H04L 43/04* (2013.01); *H04L 63/1425* (2013.01); *H04L 67/12* (2013.01); *H04W 4/043* (2013.01); *H04W 4/33* (2018.02); *H04W 8/22* (2013.01); *H04W 12/08* (2013.01); *H04W 24/08* (2013.01); *H04W 76/18* (2018.02); *H04L 43/08* (2013.01); *H04W 4/48* (2018.02); *H04W 8/18* (2013.01)

(58) Field of Classification Search
CPC ... H04W 4/043; H04W 12/08; H04W 76/027; H04W 24/08; H04W 8/22; H04L 63/1425; H04L 43/04; H04L 67/12; H04B 17/345

See application file for complete search history.

(56) References Cited

U.S. PATENT DOCUMENTS

| | | | | |
|---|---|---|---|---|
| 2009/0037526 | A1* | 2/2009 | Elliott | A63F 13/12 709/203 |
| 2014/0094143 | A1* | 4/2014 | Ayotte | G06Q 50/18 455/411 |

(Continued)

*Primary Examiner* — Chuong A Ngo

(74) *Attorney, Agent, or Firm* — Sage Patent Group

(57) ABSTRACT

A network analysis terminal is described that operates within a vehicle cabin to generate connectivity metrics. The terminal monitors packets communicated through at least one cabin network between a content server and passenger terminals. The terminal identifies passenger terminal identifiers that are addressed by content of the packets, and identifies names of vehicle passengers associated with the packets using the passenger terminal identifiers as indexes to retrieve the names of vehicle passengers from an information repository that maps names of vehicle passengers to passenger terminal identifiers. The terminal then generates connectivity metrics based on measurements performed on the packets over time and the identified names of the passengers, and controls communications through the at least one cabin network based on the connectivity metrics.

21 Claims, 14 Drawing Sheets

(51) Int. Cl.
    *H04L 29/06*     (2006.01)
    *H04W 4/04*     (2009.01)
    *H04W 4/48*     (2018.01)
    *H04W 8/18*     (2009.01)

(56) References Cited

U.S. PATENT DOCUMENTS

2014/0282727 A1* 9/2014 Keen .................. H04N 21/4222
                                                                                        725/37
2017/0188201 A1* 6/2017 Cansino ................ H04W 4/046
2017/0201446 A1* 7/2017 Heron ................ H04L 43/0876

* cited by examiner

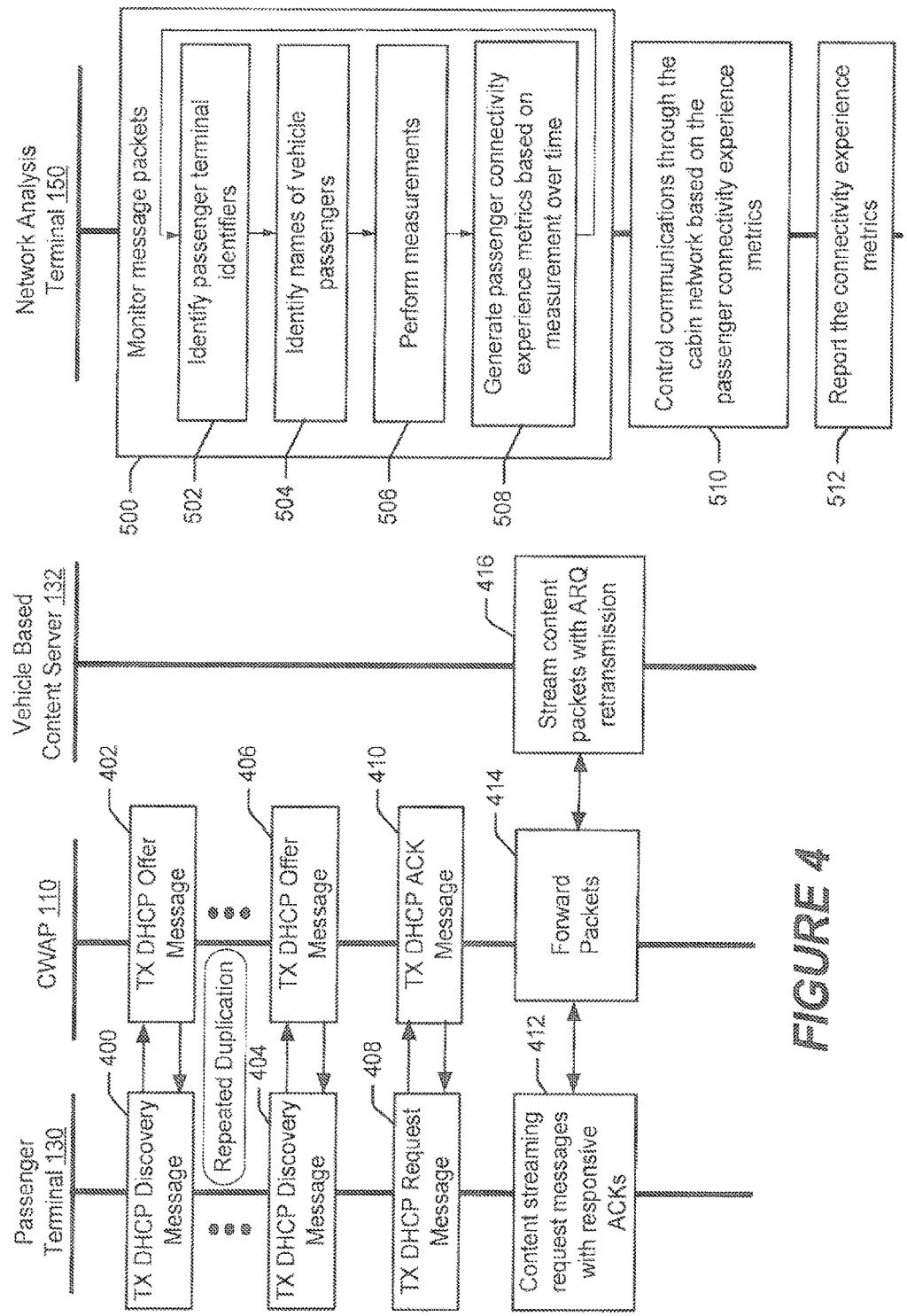

CONTROLLING VEHICLE CABIN NETWORKS BASED ON CONNECTIVITY METRICS

CROSS REFERENCE TO RELATED APPLICATIONS

The present application is a continuation of U.S. patent application Ser. No. 15/234,788 filed on Aug. 11, 2016, the disclosure and contents of which is incorporated herein by reference in its entirety.

TECHNICAL FIELD

The present disclosure relates to monitoring performance of vehicle communication systems, such as in-flight entertainment systems.

BACKGROUND

In-flight entertainment (IFE) systems are deployed onboard aircraft to provide entertainment services for passengers in a passenger cabin. The IFE systems typically provide passengers with television and audio multimedia entertainment programming.

One type of IFE system is a "server centric" architecture where multimedia content is located on a server or a set of servers installed in an electronic bay in the airplane. Video content is played through displays installed at overhead locations or within seatbacks, and associated audio content is played through jacks provided in seat armrests.

Another type of IFE system is a "seat centric" architecture where content is stored in mass data storage devices located at individual seats and played through associated seat displays. The server (or set of servers) acts as an injection point for content that will be later installed locally into the seat mass data storage devices, and also acts as a secondary source for content that may not fit in the seat mass data storage devices.

There has also been an emergence of wireless systems providing connectivity within server centric architectures and seat centric architectures to passenger personal electronic devices (PEDs) or "passenger terminals", such as Internet access, as well as limited streaming entertainment, such as movies. These systems use servers to provide content through Cabin Wireless Access Points (CWAPs) installed at spaced apart locations along the airplane cabin.

With the proliferation of the number of different types of vehicle entertainment systems and associated cabin equipment along with the increasing use of a myriad of different types and configurations of terminals that are carried onboard by passengers, it is becoming increasingly difficult to assess whether such systems are performing acceptably and what is contributing to operational limitations or problems.

SUMMARY

Some embodiments of the present invention are directed to a network analysis terminal that operates within a vehicle cabin. The network analysis terminal includes a network interface that is configured to monitor packets communicated through at least one cabin network between a content server and passenger terminals. A processor is connected to receive packets monitored by the network interface, and is configured to identify passenger terminal identifiers that are addressed by content of the packets. Names of vehicle passengers associated with the packets are identified using the passenger terminal identifiers as indexes to retrieve the names of vehicle passengers from an information repository that maps names of vehicle passengers to passenger terminal identifiers. Connectivity metrics are generated based on measurements performed on the packets over time and the identified names of the passengers. Communications through the at least one cabin network are controlled based on the connectivity metrics.

These and other operations and methods disclosed herein can non-intrusively monitor the operation of passenger terminals utilizing one or more cabin networks within a vehicle. A passenger terminal that is interfering with communications between cabin wireless access points and other passenger terminals can be reported to a crew member with an identification of the associated passenger name and/or can be blocked from accessing the cabin wireless access points. The network analysis terminal can provide a listing of the passenger names to an onboard or off-board registry that can determine whether one of the passengers is a potential problem and, if so, can trigger notification to a crew member and/or block access to the cabin wireless access points. For a network provider (such as a manufacturer of IFE systems) or a passenger carrier (such an airline operator), how well the communication system is performing from particular passengers' perspectives is important for the success of the service. Moreover, the passenger owned terminals which are being used to interface to the cabin networks may be the source of performance limitations. The connectivity metrics can be used to effectively identify the source of system operational limitations or problems.

Other network analysis terminals and related methods and computer program products according to embodiments of the present disclosure will be or become apparent to one with skill in the art upon review of the following drawings and detailed description. It is intended that all such additional network analysis terminals, methods, and computer program products be included within this description and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 4 is a combined flowchart and data flow diagram of operations and methods performed by a passenger terminal, a CWAP, and a content server according to some embodiments;

FIGS. 5-12 illustrate operations and methods performed by the network analysis terminal in accordance with some embodiments;

DETAILED DESCRIPTION

In the following detailed description, numerous specific details are set forth in order to provide a thorough understanding of aspects of the invention. However, it will be understood by those skilled in the art that the present invention may be practiced without these specific details. In other instances, well-known methods, procedures, components and circuits have not been described in detail so as not to obscure the present invention.

Although various embodiments are explained herein in the context of entertainment systems for an In-Flight Entertainment (IFE) environment of an aircraft, other embodiments are not limited thereto and may be used in other types of vehicles, including, without limitation, ships, buses, and trains. Thus reference to a vehicle cabin can correspond to the passenger space that is moved by any such vehicle.

Various embodiments of the present disclosure are directed to non-intrusively measuring the passenger (user) experience of one or more passengers utilizing one or more cabin networks within a vehicle. For a network provider (such as a manufacturer of IFE systems) or a passenger carrier (such an airline operator), how well the communication system is performing from particular passengers' perspectives is important for the success of the service. While the hardware platform(s) may be functioning properly, software components and other factors (such as RF interference in a wireless network) may still result in a poor passenger experience. Moreover, the passenger owned terminals which are being used to interface to the cabin networks may be the source of performance limitations or problems. The passenger connectivity experience metrics can be used to identify the source of such limitations or problems.

Known network analysis tools can operate within components of a communication network to query or monitor certain hardware and/or software performance metrics. However, the terminals carried onboard by passengers ("passenger terminals") are not part of the cabin communication equipment and thus can't be effectively monitored. Hence, operational problems occurring within passenger terminals may not be effectively identified, measured, or analyzed.

Various operations and methods that can be performed to provide improved monitoring and analysis of passenger connectivity experiences with using one or more cabin networks are described below in the non-limiting context of an aircraft IFE environment.

Figure 1:
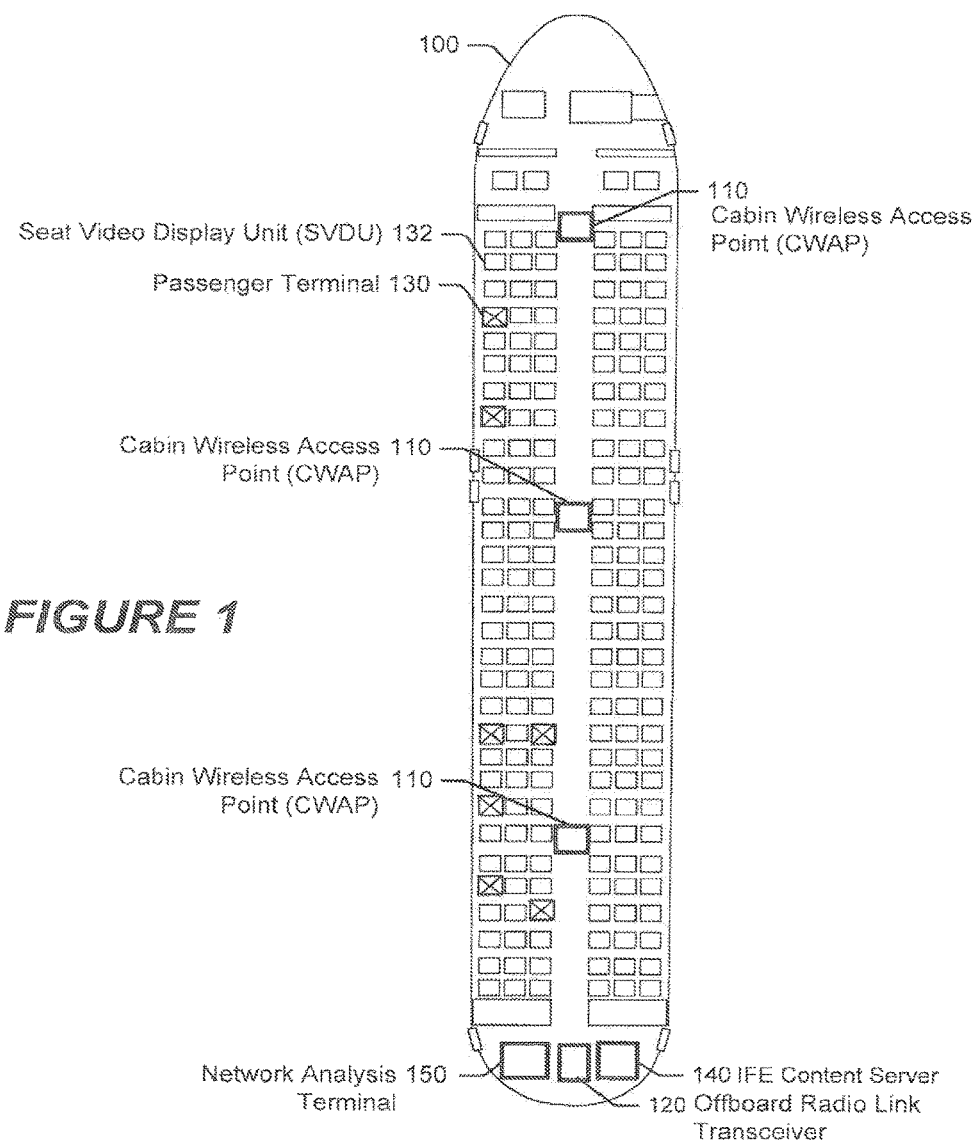
FIG. 1 illustrates a network analysis terminal that generates passenger connectivity experience metrics based on measurements of packets communicated for an IFE system having cabin wireless access points (CWAPs) that interconnect seat video display units (SVDUs) and passenger terminals to a content server, in accordance with some embodiments.

FIG. 1 illustrates an IFE system that includes Cabin Wireless Access Points (CWAPs) 110 that are installed (mounted) at spaced apart locations along a passenger aisle within an aircraft cabin 100 to provide corresponding wireless communication service cells to seat Video Display Units (VDUs) or SVDUs 132, passenger terminals 130, and other types of wireless terminals. The CWAPs 110 communicate through a wireless air interface that can be operated based on one or more communication protocols including, without limitation, IEEE 802.11, 3GPP Long Term Evolution (LTE), Bluetooth, WIMAX, light WIFI, etc. Because embodiments of the present disclosure can be used in other environments, a CWAP can also be more generally referred to as a wireless access point (WAP).

The seat VDUs 132 may include displays that are mounted to seatbacks, to tray tables that are deployable from armrests, and/or to other seat structure or cabin structure. The passenger terminals 130 may correspond to any personal wireless terminal having wireless communications capabilities for communicating with the CWAPs and which can be carried by a passenger onto an aircraft, including, without limitation, tablet computers, laptop computers, palmtop computers, cellular smart phones, media players, etc. Embodiments of the present disclosure can be used with any plural number of CWAPs 110, seat VDUs 132, and passenger terminals 130, and are not limited to the example numbers shown in any of the figures.

The seat VDUs 132 and the passenger terminals 130 can be used by passengers for IFE services in which video and other content is wirelessly communicated from an IFE content server 132 via packets containing IP addresses of the seat VDUs 132 and/or passenger terminals 130. The packets are routed through the CWAPs 110 that provide wireless communication service to those seat VDUs 132 and/or passenger terminals 130. Passengers may also be provided in-flight shopping services through the seat VDUs 132 and the passenger terminals 130 based on product catalogs that are downloaded from the content server 140. The seat VDUs 132 and the passenger terminals 130 may also be provided Internet connectivity through the CWAPs 110 and an off-board radio link transceiver 120 (e.g., Satellite communication link, cellular communication link, etc.) to a ground based Internet or private network access edge router.

In accordance with various embodiments herein, the IFE system of FIG. 1 includes a network analysis terminal 150 that generates passenger connectivity experience metrics based on measurements of packets being communicated between the CWAPs 110 and the passenger terminals 130 and/or between the CWAPs 110 and the seat VDUs 132, and or may be connected to generate passenger connectivity experience metrics based on measurements of packets between the CWAPs 110 and the content server 132, in accordance with some embodiments.

The network analysis terminal 150 actively monitors network traffic between passenger terminals 130, seat VDUs 132, and/or other endpoints and the end services with which they are communicating (e.g., the content server 132 and/or the off-board radio link transceiver 120 to an off-board Internet server). Passenger connectivity experience metrics are generated that can be used to determine not just that the users are able to access the services, but also measure defined performance characteristics of those services. This provides significant insight into how those passengers perceive the quality of experience with using those services.

This network analysis terminal 150 can be tailored to monitor operations and performance of specific service end-points both internally (e.g., the content server 132 and/or the off-board radio link transceiver 120 to an off-board Internet server) and externally (e.g., website or content provided by networked web server).

The diagram above shows a typical cabin network in which passengers utilize various passenger terminals 130 (e.g., smart phones, tablet computers, laptop computers, etc) that communicate via the CWAPs 110 and a backbone wired network (e.g., Ethernet). This cabin network typically can include local services such as network services (e.g., DHCP, DNS, and routing functional services). The off-board radio link transceiver 120, the content server 132, and/or another component can perform router operations that route passenger network traffic to onboard services or off-board to, e.g., the Internet to access web sites and/or services from third parties (e.g., Google or Amazon operated web servers).

The network analysis terminal 150 is positioned and configured to "hear" the bi-directional traffic flow between the passengers and the service points through the cabin network. This terminal 150 examines the network traffic flows between the passengers and the service points and performs qualitative measurements on the availability and performance of those communications. The terminal 150 may perform deep packet inspection to identify which onboard or off-board service is associated with the communication (e.g., streaming audio from Amazon web server) and/or which operational state of a protocol is being invoked by the packet. Optionally, results of the measurements can be fed back into the IFE system and/or components of the cabin network, and/or can be forwarded to a crew terminal and/or to a system operator console, which may be onboard or off-board, to improve and/or enhance the passenger's connectivity experience.

Various embodiments of the network analysis terminal 150 operate to detect devices using the cabin network and actively analyzes packet flows and/or related protocol transitions between each device and service end points. For example, in some systems there are specific known packet exchanges that are expected to be observed by the network analysis terminal 150 when the service end points and cabin network components are operating normally. These exchanges can be detected and analyzed, to determine whether the associated services are both available and have acceptable performance metrics compared to acceptable availability policies and performance rules. Quality of service can be measured, such as the timing jitter experienced between packets provided in a sequence for a service, error rate across the packets, packet retransmission rates due to errors or dropped packets, etc.

As part of the measurement process, both quality and performance attributes can be analyzed. The throughput and latency of the packet exchanges can be analyzed to detect if there is system degradation that satisfies a defined action rule which triggers an associated defined remediation action. Retransmissions of packets and/or flow control requests can be observed and measured to detect potential communication performance bottlenecks, presence of interfering passenger terminals, poorly operating passenger terminals, and other system communication issues.

The network analysis terminal 150 can be further enhanced and customized to analyze specific service requests, e.g., HTTP requests, to collect additional information about the passengers' behaviors and service end point usage patterns.

These operations and capabilities may, in some embodiment, be performed when communication traffic through the cabin network is encrypted. For example, the network analysis terminal 150 can observe and measure content of protocol information that is communicated as unencrypted data with encrypted user traffic packets. The network analysis terminal 150 can analyze data provided by Ethernet and TCP/IP layers, where data is not encrypted (except in some wireless networks). In some embodiments, the network analysis terminal 150 is provided necessary encryption information to allow decryption of network packets that are encrypted by the service end points and/or by components of the cabin network.

In some embodiments, the network analysis terminal 150 interacts with passenger terminals 130 and/or other end point devices in a listen/receive only mode, so that there is no inherent additional impact on the cabin network performance and operation. The terminal 150 can analyze the network packet traffic in "real-time" and compute passenger connectivity experience metrics related to each passenger terminal and the related specific behaviors of different passengers. As explained above, the generated passenger connectivity experience metrics can be optionally fed back to control operation of the IFE system and/or components of the cabin network, and/or can be forwarded to a crew terminal and/or to a system operator console.

Although the network analysis terminal 150 is illustrated as being separate from the content server 132 and components of the cabin network, it may in some other embodiments be at least partially incorporated into the content server 132, a CWAP 110, or another component of the cabin network. The network analysis terminal 150 can be a stand-alone tablet computer particularly configured to perform one or more of the embodiments disclosed herein. It may be desirable to host operations of the network analysis terminal 150 as close to the passenger's environment as possible, so that the terminal operations can analyze as much traffic as possible between the passenger terminals 130 and service points.

The network analysis terminal 150 can include a wireless network interface configured to listen to packets communicated through a wireless air interface and/or may have a "wired" network interface to a wired network (e.g., Ethernet or other wired LAN). However, if the terminal 150 only has a wired network interface it may be difficult or not possible to detect issues within the "wireless" network (such as interference). The network analysis terminal 150 can include multiple network interfaces (wired and/or wireless) that operate to simultaneously monitor multiple networks and/or network access points, e.g., CWAPs 110.

Additional (external) sensors could be added to capture additional data items to enhance the types passenger connectivity experience metrics that can be generated and the accuracy of those metric. Some such sensors may include items such as: time sources, Radio Frequency sensors (for WiFI type networks), etc.

Figure 2:
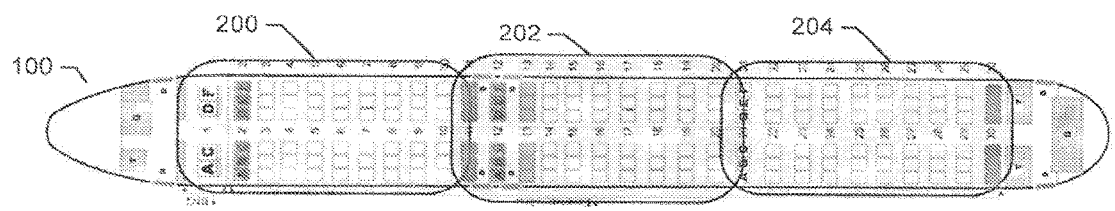
FIG. 2 illustrates example serving cells provided by the CWAPs mounted to ceiling structure along an aisle of the aircraft cabin.

FIG. 2 illustrates example serving cells 200, 202, 204 provided by the CWAPs 110 (FIG. 1) mounted to ceiling structure along an aisle of the aircraft cabin 100. The network analysis terminal 150 may be movable along the aisle through the serving cells 200, 202, 204 by a crew member and/or other operator to perform measurements of packets being communicated between the respective CWAPs 110 and the passenger terminals 130, seat VDUs 132, and/or other communication terminals.

Figure 3:
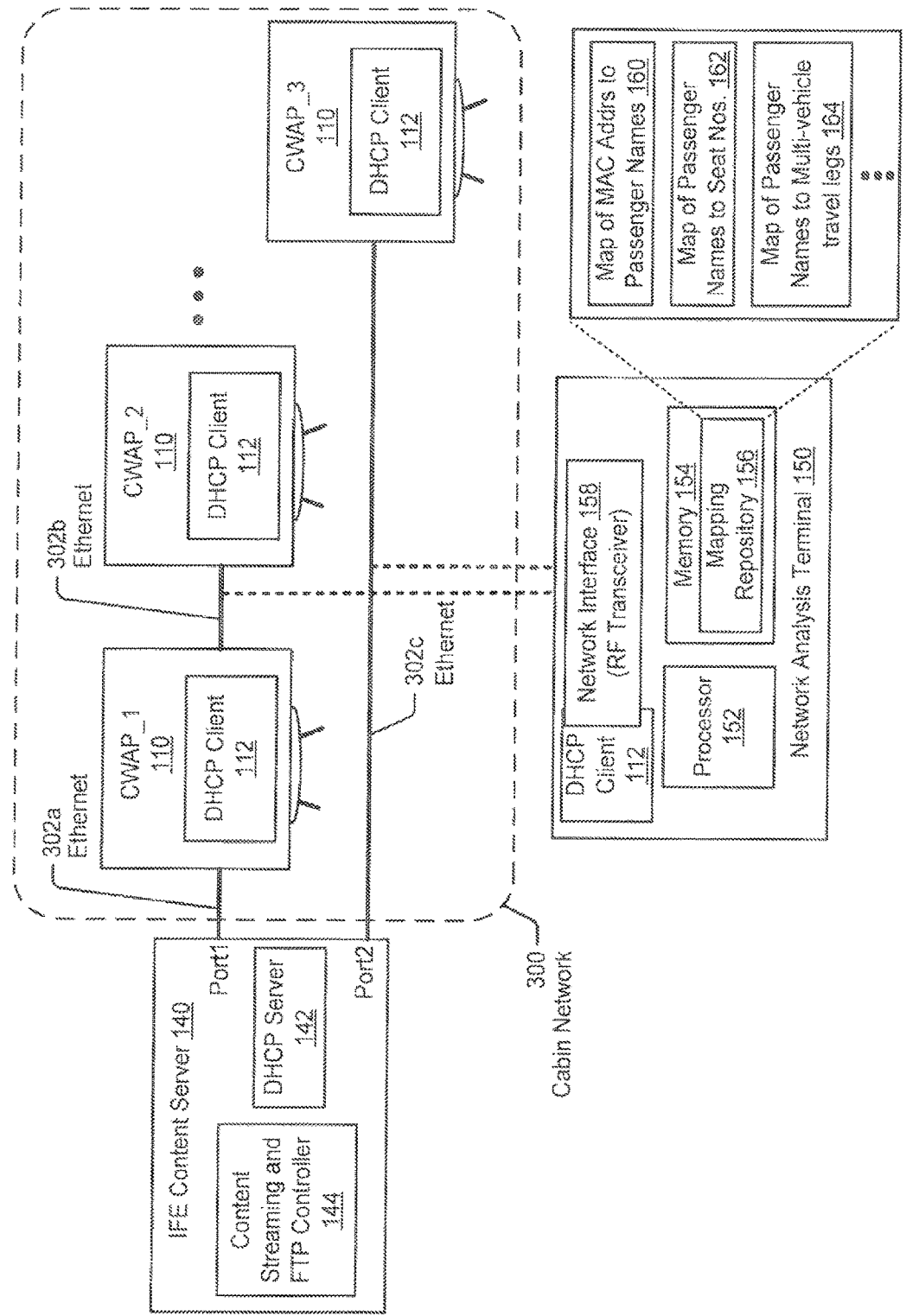
FIG. 3 is a block diagram of the CWAP server, the CWAPs, and the IFE content server of FIG. 1 configured according to some embodiments.
Figure 6:
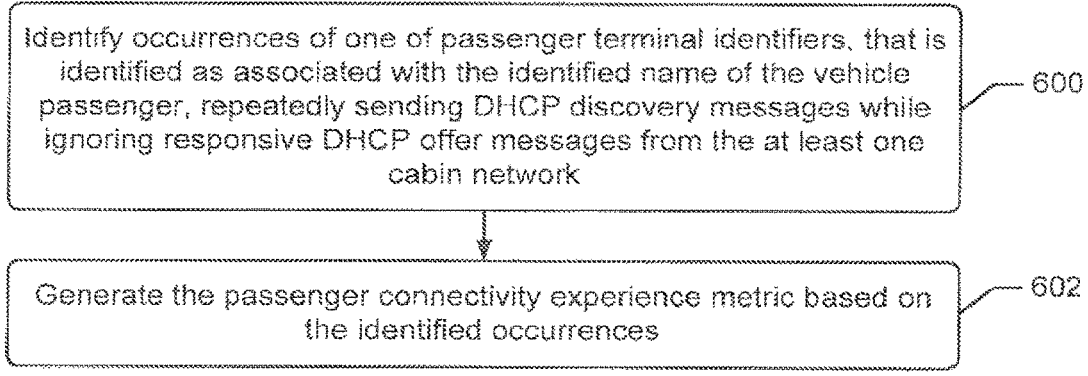

FIG. 3 is a block diagram of the IFE system and network analysis terminal of FIG. 1 configured according to some embodiments. The system includes a content server 132 that communicates with passenger terminals, not shown, via a cabin network 300. The illustrated cabin network 300 includes CWAPs 110 (e.g., CWAP_1, CWAP_2, and CWAP_3). CWAP_1 and CWAP_2 are serially connected to Port 1 of the content server 132 via Ethernet segments 302*a* and 302*b*. In contrast, CWAP_3 is connected to Port 2 of the content server 132 via Ethernet segment 302*c*. The network analysis terminal 150 can be configured to monitor the wireless air interface used by the cabin network 300 and/or can be connected to one or more of the Ethernet segments 302 to receive packets communicated between two or more of: the content server 132; the CWAPs 110; the passenger terminals 130; the seat VDUs 132; and/or other components of the IFE system.

In the illustrated example, the content server 132 includes a Dynamic Host Configuration Protocol (DHCP) server 142. Some or all of the CWAPs 110, the passenger terminals 130, the network analysis terminal 150, and other devices that communicate with the content server 132 can include a DHCP client 112. A device uses the DHCP client 112 to acquire from the DHCP server 142 an IP address used to address communications to that device when communicating through the cabin network 300. In an IFE environment, the DHCP server 142 may maintain a configuration file that contains mapping between defined IP addresses and physical locations where the CWAPs 110 are installed, and may select among the defined IP addresses for assignment to a CWAP 110 based on a physical location of the CWAP 110.

The content server 132 can include a content streaming and File Transfer Protocol (FTP) controller 144 that provides content, such as a movies, television programs, electronic books and magazines, audio, games, etc., to seat VDUs 132 and passenger terminals 130. Some content may be streamed, e.g., movies, via a streaming protocol responsive to on-demand requests initiated by passengers, while other content, e.g., games, may be transferred as files via FTP.

The network analysis terminal 150 includes a network interface 158, a processor 152, and a memory 154. The network interface 158 may include a wired network interface (e.g., Ethernet, USB, etc.) and/or a wireless transceiver interface (e.g., IEEE 802.11, LTE, Bluetooth, WIMAX, Light WIFI, etc.). The terminal 150 can use its wireless transceiver interface to receive and decode packets that are being communicated through a wireless air interface between one or more of the CWAP 110 and one or more of the passenger terminals 130, the seat VDUs 132, etc.

The processor 152 may include one or more data processing circuits, such as a general purpose and/or special purpose processor (e.g., microprocessor and/or digital signal processor) that may be collocated or distributed across one or more networks. The processor 152 is configured to execute computer readable program code in the memory 154, described below as a non-transitory computer readable medium.

The memory 154 can include program code that performs some or all of the operations and methods that are described herein for one or more of the embodiments of a network analysis terminal. The memory 154 can include a DHCP client 112 and a mapping information repository 156 that contains information used to map names of vehicle passengers to passenger terminal identifiers, e.g., MAC addresses. The mapping repository 156 may include information 160 mapping media access control (MAC) addresses to passenger names, an electronic passenger manifest 162 mapping passenger names to seat numbers, and an electronic set of passenger itineraries 164 mapping passenger names to multi-vehicle travel legs. The electronic passenger manifest 162 can logically associate MAC addresses with passenger names and assigned seat numbers within the vehicle. The set of passenger itineraries 164 can logically associate the vehicle passengers with vehicle identifiers for vehicles that are scheduled to transport the respective vehicle passengers during multi-vehicle travel legs of respective trips.

Example operations that can be performed by the network analysis terminal 150 to generate passenger connectivity experience metrics and identify a problematic communication sequence as explained with reference to FIGS. 4 and 5.

FIG. 4 is a combined flowchart and data flow diagram of operations and methods performed by a passenger terminal 130, a CWAP 110, and a content server 132 according to some embodiments. FIG. 5 illustrates operations and methods performed by the network analysis terminal 150 in accordance with some embodiments.

Referring to FIG. 4, the passenger terminal 130 performs the Dynamic Host Configuration Protocol (DHCP) operations through communications with the CWAP 110, and the DHCP server 142, to request Internet Protocol (IP) parameters, including assignment of an IP address thereto. The DHCP clients and server employ a connectionless service model, using the User Datagram Protocol (UDP).

The network analysis terminal 150 observes that the passenger terminal 130 has transmitted (block 400) a DHCP discovery message packet, which is an IP address lease request. The terminal 150 also observes that the CWAP 110 has transmitted (block 402) a DHCP offer message packet toward the passenger terminal 150 responsive to the DHCP discovery message. The terminal 150 subsequently observes repeated duplication of the cycle of packet transmissions of DHCP discovery messages and responsive DHCP offer messages between the passenger terminal 130 and the CWAP 110, including the passenger terminal 130 transmission (block 404) and the CWAP 110 responsive transmission (block 406).

The network analysis terminal 150 thereby identifies occurrences of the passenger terminal identifier (e.g., MAC address) of the passenger terminal 130 repeatedly sending DHCP discovery messages through the cabin network 300 while apparently ignoring responsive DHCP offer messages from the cabin network 300, and operates to generate a passenger connectivity experience metric based on the identified occurrences. The passenger connectivity experience metric can indicate that the passenger terminal 130 is not properly operating when performing the DHCP protocol, and may identify the name of the passenger who is known to be associated with the passenger terminal identifier and may identify characteristics of the passenger terminal 130 based on content of those observed packets. The identified characteristics of the passenger terminal 130 can include the type of operating system hosted by the terminal 130, the operating system version, the hardware terminal type, the manufacturer identifier (e.g., based on known MAC address ranges known to have been assigned to different terminal manufacturers), etc., which may be determined based on deep packet inspection of content of the observed packets.

The network analysis terminal 150 continues monitoring packets transmitted through the wireless air interface and observes a further DHCP request message packet transmitted (block 408) by the passenger terminal 130 and a responsive DHCP acknowledgment message transmitted (block 410) by the CWAP 110, indicating that the passenger terminal 130 has finally accepted the transmitted (block 406) DHCP offer message. The terminal 150 subsequently monitors packets communicated between the passenger terminal 130 and the CWAP 110 as content is requested by the passenger terminal 130 and responsively streamed from the content server 132 through the CWAP 110. More particularly, the terminal 150 can observe content streaming request messages transmitted (block 412) by the passenger terminal 130 and observe responsive content packets streamed (block 416). Terminal 150 can further observe acknowledgments transmitted (block 412) by the passenger terminal 130 responsive to receiving, decoding, and performing acceptable error-checking on the received content packets, and can observe automatic request (ARQ) retransmission of content packets by the content server 132 responsive to absence of ARQ packets from the passenger terminal 130 within a threshold timeframe of the corresponding content packet transmission. The CWAP 110 forwards (block 414) packets received through the wireless air interface from the passenger terminal 130 toward the addressed content server 132, and similarly forwards packets received through the wireless air interface from the content server 132 toward the addressed passenger terminal 130.

With further reference to FIG. 5, the network analysis terminal 150 monitors (block 500) message packets being communicated through the wireless air interface of the cabin network 300. The terminal 150 identifies (block 502) passenger terminal identifiers that are addressed by content of the packets. The terminal 150 identifies (block 504) names of vehicle passengers associated with the packets using the passenger terminal identifiers as indexes to retrieve the names of vehicle passengers from the information repository 160 that maps names of vehicle passengers to passenger terminal identifiers. The terminal 150 performs measurements (block 506) on the packets over time. Various measurements that be performed by the terminal 150 are explained in further detail below. The terminal 150 generates (block 508) passenger connectivity experience metrics based on the measurements. The passenger connectivity experience metrics indicate network connectivity performance experienced by the identified names of vehicle passengers while operating passenger terminals using the cabin network 300. The terminal 150 controls (block 510) communications through the cabin network 300 based on the passenger connectivity experience metrics, and may report (block 512) the connectivity experience metrics to another component of the cabin network 300, a crew terminal, an operator computer may be an-board or off-board the aircraft, etc.

The network analysis terminal 150 may operate to identify names of vehicle passengers associated with the packets, by receiving a message through the network interface 158 from an application executed by one of the passenger terminals 130 that stores a boarding pass and/or a reservation confirmation for one of the vehicle passengers, the message containing the name of the one of the vehicle passengers and a MAC address for a network interface circuit of the one of the passenger terminals. The terminal 150 then stores the name of the one of the vehicle passengers and the MAC address with a logical association to each other within the information repository 160 in a memory.

The network analysis terminal 150 may operate to generating a passenger connectivity experience metric for one of the identified names of a vehicle passenger based on measurements performed on a series of packets that each contain an address for one of passenger terminal identifiers that is identified from the information repository 160 as being associated with the identified name of the vehicle passenger, while excluding from the generation of the passenger connectivity experience metric for the one of the identified names any measurements performed on packets that do not contain the address for the one of passenger terminal identifiers that is identified as associated with the identified name of the vehicle passenger. Thus, for example, the metric can generated based measurements performed on only packets that contain the MAC address for a particular one of the passenger terminals 140. The metric thereby represents the network connectivity experience of one passenger who is operating the particular terminal.

In some embodiments, the operations for identifying passenger terminal identifiers that are addressed by content of the packets, include identifying MAC addresses for network interface circuits 158 of the passenger terminals 140. The operations for identifying names of vehicle passengers associated with the packets using the passenger terminal identifiers as indexes to retrieve the names of vehicle passengers from the information repository 160, can include querying the information repository 160 to identify one of the passenger names that is logically associated with one of the MAC addresses that has been identified as content of one of the packets observed by the terminal 150.

The network analysis terminal 150 can operate to generate the passenger connectivity experience metric, based on obtaining an electronic passenger itinerary, e.g., from the set of passenger itineraries 164, that logically associates the identified name of the vehicle passenger with vehicle identifiers for vehicles that are scheduled to transport the vehicle passenger during multi-vehicle travel legs of a trip. The terminal 150 can update the passenger connectivity experience metric responsive to receipt of further packets associated with the identified name of the vehicle passenger during the duration of a present one of the multi-vehicle travel legs of the trip, and store the updated passenger connectivity experience metric in the electronic passenger itinerary repository 164 with a logical association to the identified name of the vehicle passenger and a logical association to the vehicle identifier for the vehicle. Thus, metrics can be generated over multiple legs of flights of different aircraft, with the resulting metrics being stored in a repository that can be transferred from one aircraft to another aircraft via a ground datalink network interface, an aircraft-to-aircraft datalink network, and/or storing the metrics on the respective passenger terminals 140 for transport by passengers between the aircraft.

Various further embodiments related to how the network analysis terminal 150 can generate passenger connectivity experience metrics are now described in the context of the operational flowcharts of FIGS. 6-11.

Figure 7:
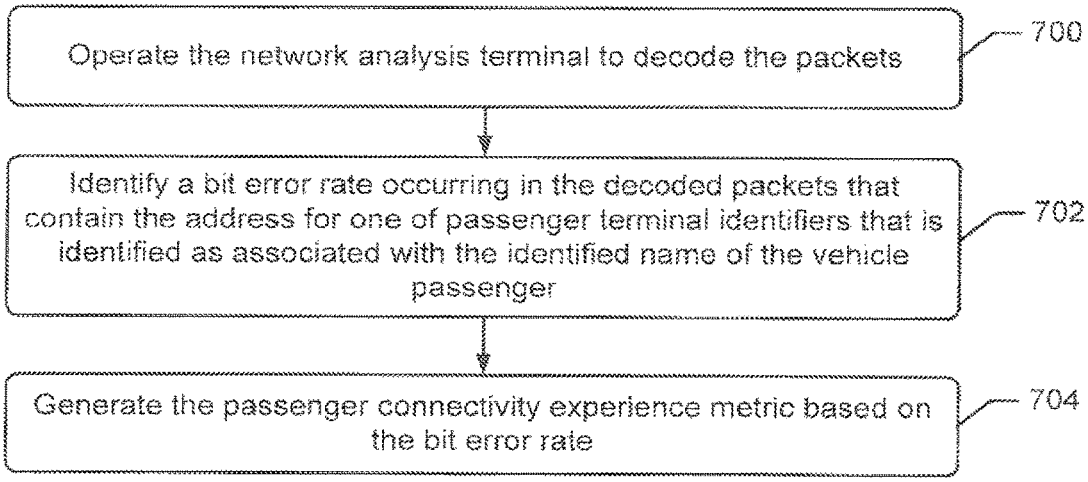

In the embodiment of FIG. 7, the network analysis terminal 150 may operate to decode (block 700) the packets, identify (block 702) a bit error rate occurring in the decoded packets that contain the address for the one of passenger terminal identifiers that is identified as associated with the identified name of the vehicle passenger, and then generate (block 704) the passenger connectivity experience metric based on the bit error rate. Accordingly, the metric can indicate the bit error rate being experienced by communications with one particular passenger via the cabin network 300, which may be affected by problematic operations performed by the particular passenger's terminal, e.g., as described for FIG. 4.

Figure 8:
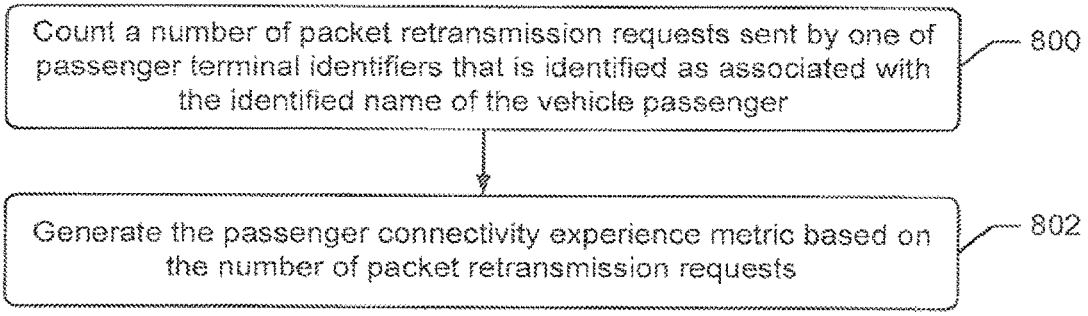

In the embodiment of FIG. 8, the network analysis terminal 150 may operate to count (block 800) a number of packet retransmission requests sent by the one of passenger terminal identifiers that is identified as associated with the identified name of the vehicle passenger, and generate (block 802) the passenger connectivity experience metric based on the number of packet retransmission requests. Accordingly, the metric can indicate the packet retransmission rate being experienced by communications with one particular passenger via the cabin network 300, which may be similarly affect by problematic operations performed by the particular passenger's terminal, e.g., as described for FIG. 4.

Figure 9:
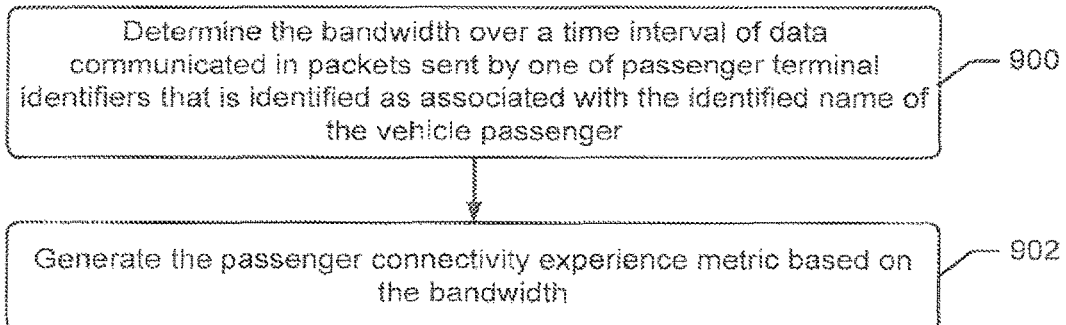

In the embodiment of FIG. 9, the network analysis terminal 150 may operate to determine (block 900) communication bandwidth (e.g., effective packet communication data rate) over a time interval of data communicated in packets sent by the one of passenger terminal identifiers that is identified as associated with the identified name of the vehicle passenger, and generate (block 902) the passenger connectivity experience metric based on the bandwidth. Accordingly, the metric can indicate the communication bandwidth experienced by one particular passenger while communicating through the cabin network 300.

Figure 10:
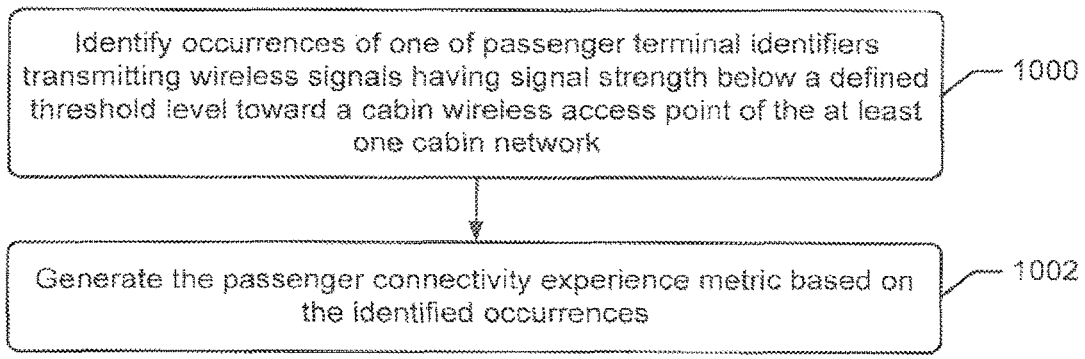

In the embodiment of FIG. 10, the network analysis terminal 150 may operate to identify (block 1000) occurrences of the one of passenger terminal identifiers, that is identified as associated with the identified name of the vehicle passenger, transmitting wireless signals having signal strength below a defined threshold level toward a CWAP 110 of the cabin network 300, and generate (block 1002) the passenger connectivity experience metric based on the identified occurrences. Accordingly, the metric may indicate whether an identified passenger is possibly having an unsatisfactory experience using the cabin network 300 due to the passenger's terminal 130 transmitting with insufficient signal strength to be reliably received by the CWAP 110 in view of interference and/or other factors affecting the communication channel.

Figure 11:
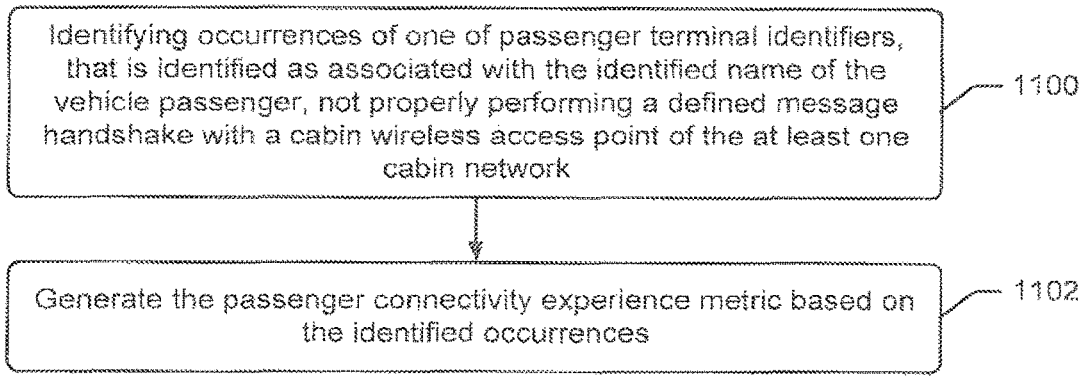

In the embodiment of FIG. 11, the network analysis terminal 150 may operate to identify (block 1000) occurrences of the one of passenger terminal identifiers, that is identified as associated with the identified name of the vehicle passenger, not properly performing a defined message handshake with a CWAP 110 of the cabin network 300. The terminal 150 can generate (block 1002) the passenger connectivity experience metric based on the identified occurrences. An example of one improper message handshake observable by the terminal 150 was described with regarding to FIG. 4. The terminal 150 can identify the name of a particular passenger who may be experiencing degraded network connection performance due to such improper handshaking by the passenger's terminal 140.

For example, as explained above, the network analysis terminal 150 may identify occurrences of a passenger terminal identifier, that is identified as associated with an identified name of the vehicle passenger, repeatedly sending DHCP discovery messages toward the cabin network 300 while apparently ignoring responsive DHCP offer messages from the cabin network 300, and can generate the passenger connectivity experience metric based on the identified occurrences. The terminal 150 may respond to determining that the passenger connectivity experience metric satisfies a defined remedial action rule, by sending a message to one or more of the CWAPs 110 instructing to block establishment of a communication link to the one of passenger terminal identifiers.

Figure 12:
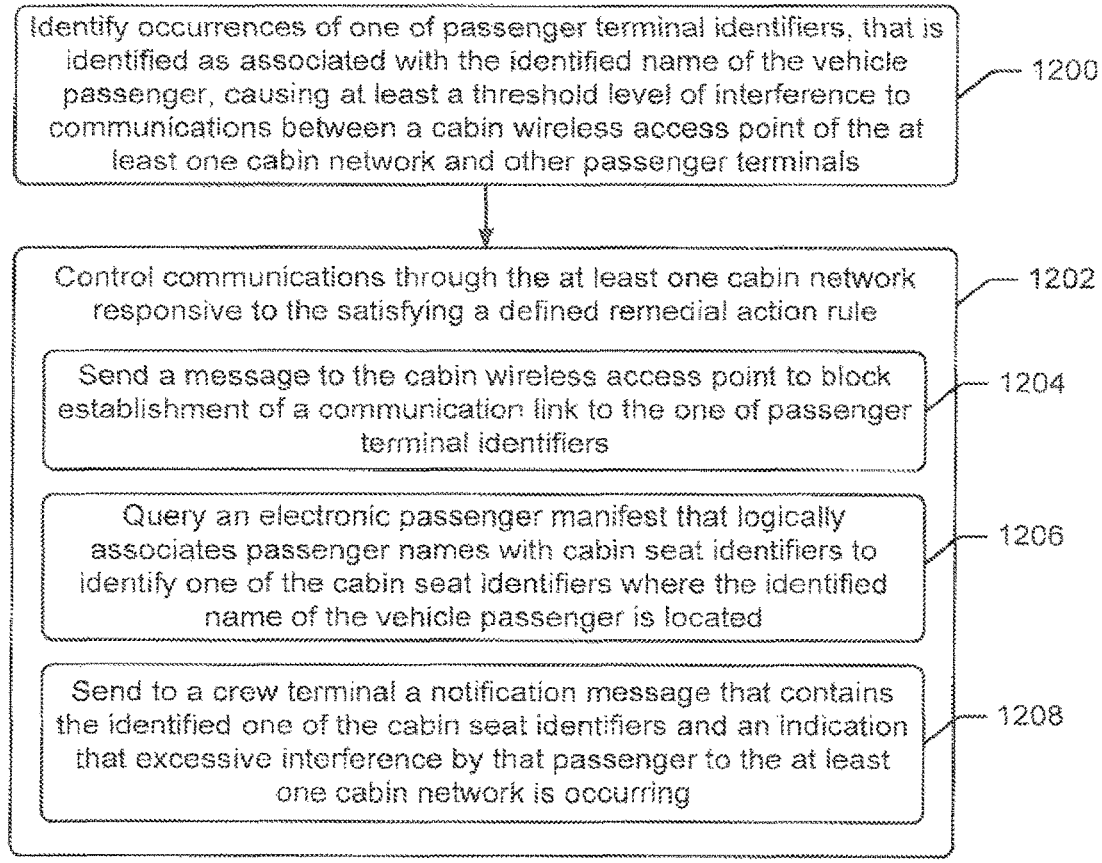

Various actions that can be performed by the network analysis terminal 150 to control communications through the cabin network 300 and/or to report the passenger connectivity experience metrics are now described with reference to the operational flowchart of FIG. 12.

In some embodiments, the network analysis terminal 150 operates to identify (block 1200) occurrences of the one of passenger terminal identifiers, that is identified as associated with the identified name of the vehicle passenger, causing at least a threshold level of interference to communications between a CWAP 110 of the cabin network 300 and other passenger terminals 140, and generates the passenger connectivity experience metric based on the identified occurrences. The terminal 150 then operates to control (block 1202) communications through the cabin network 300 by, responsive to the passenger connectivity experience metric satisfying a defined remedial action rule, sending (block 1204) a message to the CWAP 110 to block establishment of a communication link to the one of passenger terminal identifiers.

In a further or alternate embodiment, the terminal 150 responds to the passenger connectivity experience metric satisfying a defined remedial action rule, by querying (block 1206) the electronic passenger manifest 162, which logically associates passenger names with cabin seat identifiers, to identify one of the cabin seat identifiers where the identified name of the vehicle passenger is located. The terminal 150 then sends (block 1208) to a crew terminal a notification message that contains the identified one of the cabin seat identifiers and an indication that excessive interference by that passenger to the cabin network 300 is occurring.

Figure 13:
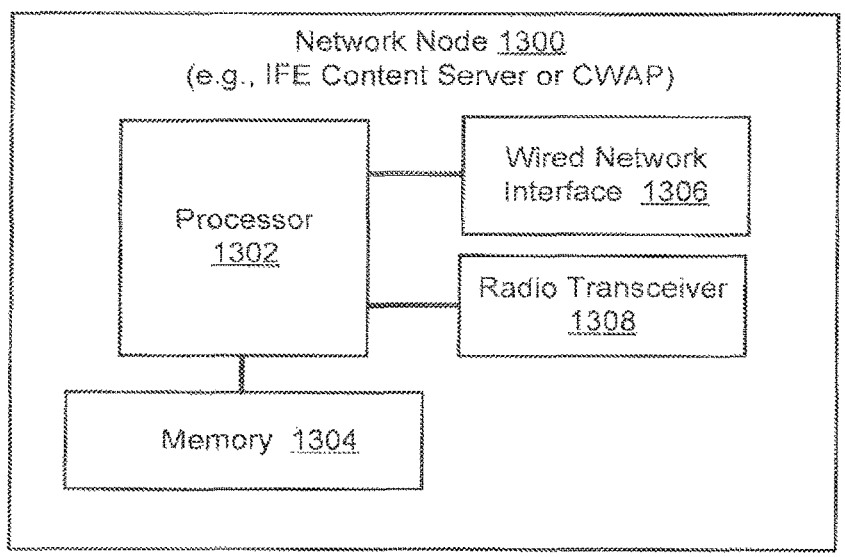
FIG. 13 is a block diagram of a network node that can be configured to operate as the content server and/or a CWAP in accordance with some embodiments.

FIG. 13 is a block diagram of a network node 1300 that can be configured to operate as a content server 132 and/or as a CWAP 110 in accordance with some embodiments. The network node 1300 includes a processor 1302, a memory 1304, and a wired network interface 1306 and/or a radio transceiver network interface 1308. The processor 1302 may include one or more data processing circuits, such as a general purpose and/or special purpose processor (e.g., microprocessor and/or digital signal processor) that may be collocated or distributed across one or more networks. The processor 1302 is configured to execute computer readable program code in the memory 1304, described below as a non-transitory computer readable medium, to perform some or all of the operations and methods that are described herein for a content server 132 and/or a CWAP 110.

Other Operations and Methods by Network Analysis Terminals:

Numerous additional and alternative operations and methods can be performed by network analysis terminals are now described in the context of FIGS. 14-21. As will be explained in further detail below, various of these embodiments can identify a passenger terminal that is interfering with communications between CWAPs and other passenger terminals, and can responsively report the passenger terminal to a crew member with an identification of the associated passenger name and/or can block the passenger terminal from accessing the CWAPs. The network analysis terminals can provide a listing of the passenger names to an onboard or off-board registry that can determine whether one of the passengers is a potential problem and, if so, can trigger notification to a crew member and/or block access to the cabin wireless access points.

Figure 14:
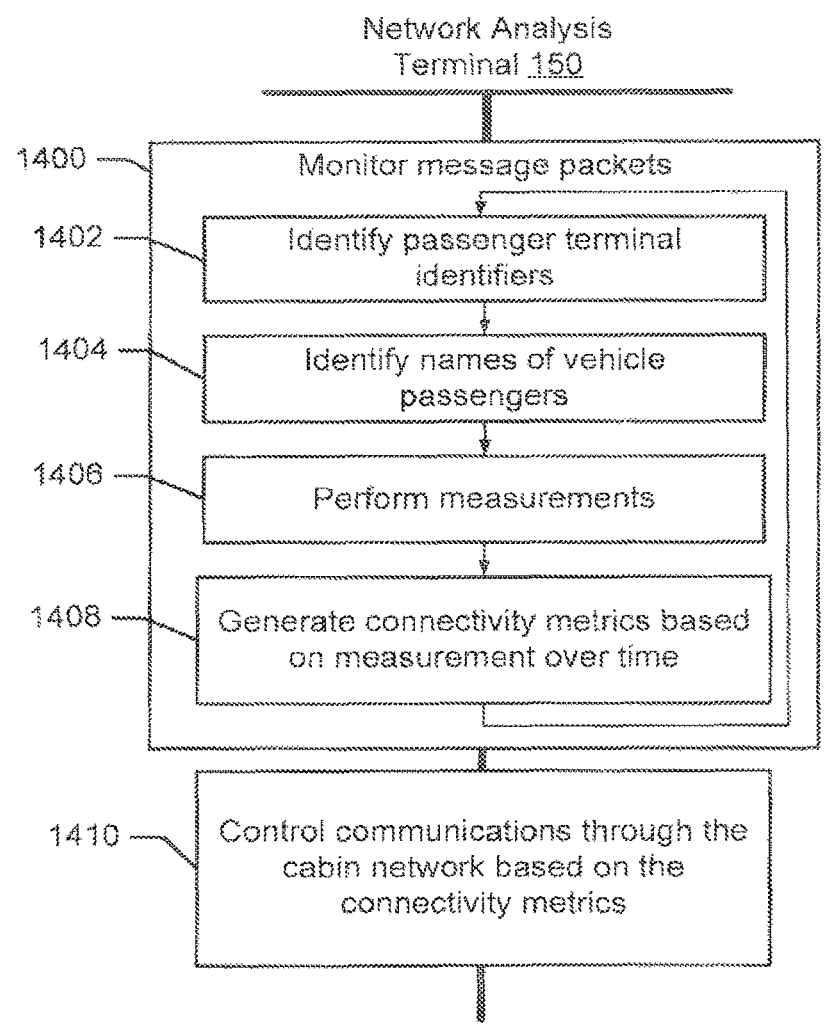
FIGS. 14-21 illustrate operations and methods performed by the network analysis terminal in accordance with some other embodiments.

Referring to FIG. 14, the network analysis terminal 150 monitors (block 1400) message packets being communicated through the wireless air interface of the cabin network 300. The terminal 150 identifies (block 1402) passenger terminal identifiers that are addressed by content of the packets. The terminal 150 also identifies (block 1404) names of vehicle passengers associated with the packets using the passenger terminal identifiers as indexes to retrieve the names of vehicle passengers from the information repository 160 that maps names of vehicle passengers to passenger terminal identifiers. The terminal 150 performs measurements (block 1406) on the packets over time. Various measurements that can be performed by the terminal 150 have been explained above and further below. The terminal 150 generates (block 1408) connectivity metrics based on the measurements performed on the packets over time and the identified names of the passengers. The terminal 150 then controls (block 1410) communications through the cabin network 300 based on the connectivity metrics.

Various alternative operations and methods for generating connectivity metrics and controlling communications through the cabin network 300 are explained with regard to FIGS. 15-21.

Figure 15:
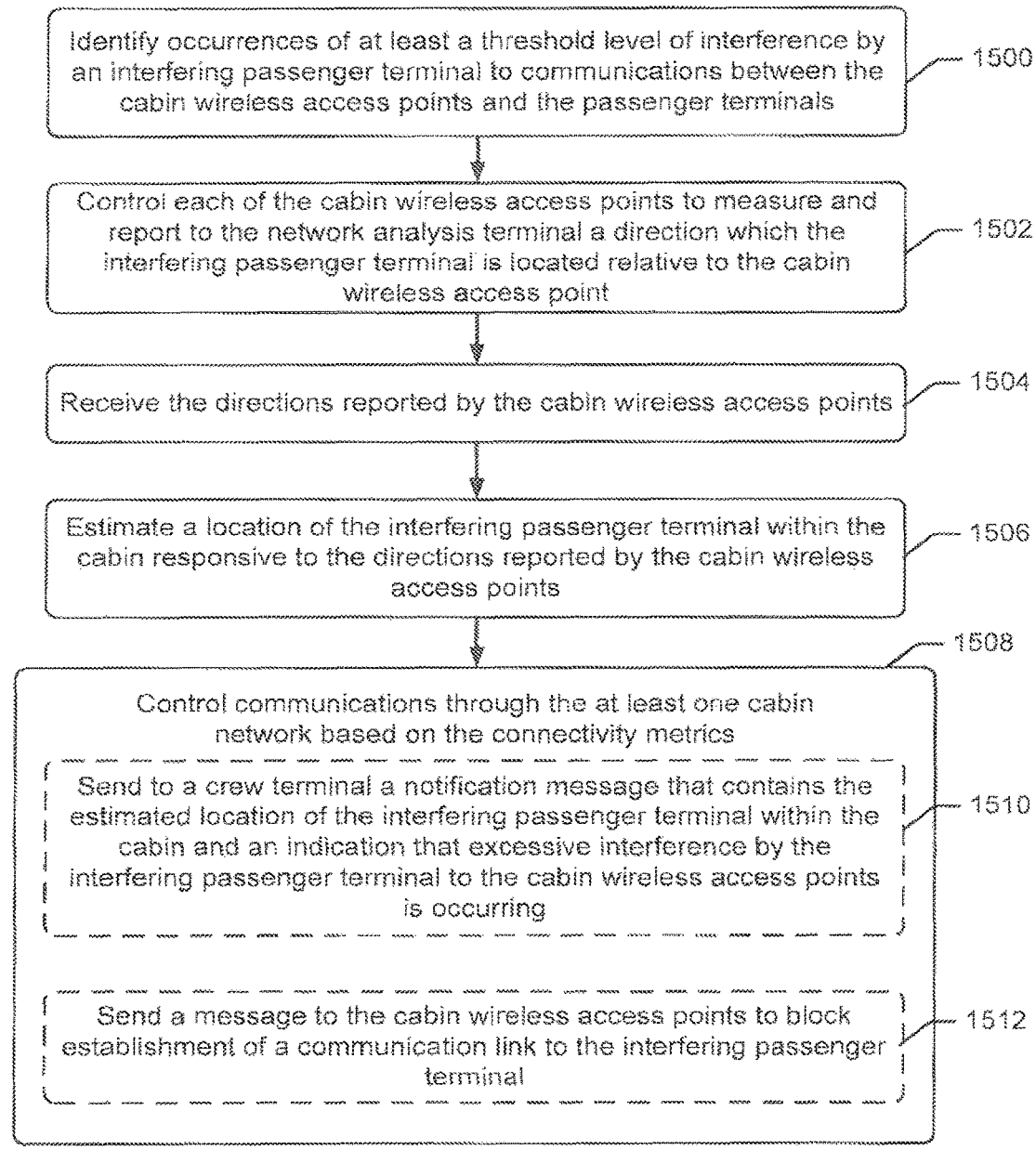

Referring to the operational embodiment of FIG. 15, when generating the connectivity metrics the network analysis terminal 150 identifies (block 1500) occurrences of at least a threshold level of interference by an interfering passenger terminal 130 to communications between the CWAPs 110 and other of the passenger terminals 130. The network analysis terminal 150 controls (block 1502) each of the CWAPs 110 to measure and report to the network analysis terminal 150 a direction which the interfering passenger terminal 130 is located relative to the CWAP 110. The network analysis terminal 150 receives (block 1504) the directions reported by the CWAPs 110, and estimates (block 1506) a location of the interfering passenger terminal 130 within the cabin responsive to the directions reported by the CWAPs 110.

The network analysis terminal 150 may responsively control (block 1508) communications through the cabin network 300 by sending (block 1510) to a crew terminal a notification message that contains the estimated location of the interfering passenger terminal 300 within the cabin and an indication that excessive interference by the interfering passenger terminal 300 to the CWAPs 110 is occurring. In this manner, a crew member can be informed of not only the presence of an interfering terminal but, moreover, the estimated location of the interfering terminal so that the crew member may attempt to communicate with the associated passenger to remedy the situation. Alternatively or additionally, the network analysis terminal 150 may control (block 1508) the communications by sending (block 1512) a message to the CWAPs 110 to block establishment of a communication link to the interfering passenger terminal 130.

Figure 16:
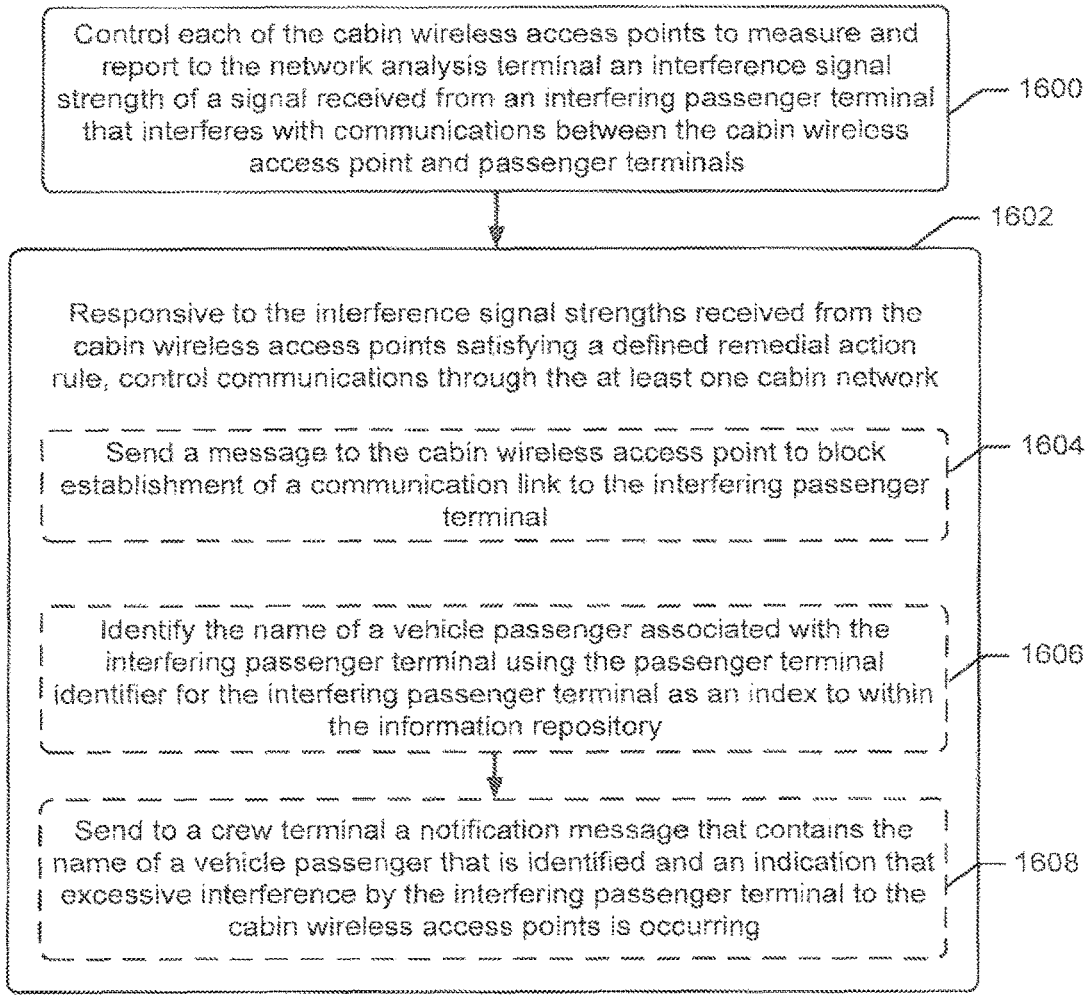

Referring to the operational embodiment of FIG. 16, when generating the connectivity metrics the network analysis terminal 150 controls (block 1600) each of the CWAPs 110 to measure and report to the network analysis terminal 150 an interference signal strength of a signal received from an interfering passenger terminal 130 that interferes with communications between the CWAP 110 and passenger terminals 130. The network analysis terminal 150 may respond to the interference signal strengths received from the CWAPs 110 satisfying a defined remedial action rule, by controlling (block 1602) communications through the cabin network 300. The control may include sending (block 1604) a message to the CWAPs 110 to block establishment of a communication link to the interfering passenger terminal. Such interference may arise when a passenger terminal is operating outside the constraints or permissive boundaries of a communications standard (e.g., failing to reduce transmitter power level responsive to a strong received signal strength indication or command from a servicing CWAP). Thus, when interference from the interfering passenger terminal 130 is measured by one or more CWAPs 110 is be above a defined threshold the network analysis terminal 150 can command the CWAPs 110 to prevent communication with the interfering passenger terminal 130 that could further interfere with ongoing communications with the other passenger terminals 130.

Alternatively or additionally, the network analysis terminal 150 may respond (block 1602) to the interference signal strengths received from the CWAPs 110 satisfying a defined remedial action rule, by identifying (block 1606) the name of a vehicle passenger associated with the interfering passenger terminal 130 using the passenger terminal identifier for the interfering passenger terminal as an index to within the information repository 156, and sending (block 1608) to a crew terminal a notification message that contains the name of a vehicle passenger that is identified and an indication that excessive interference by the interfering passenger terminal to the CWAPs 110 is occurring. The crew terminal may be onboard the vehicle or off-board the vehicle but communicatively connected thereto through a wireless data link.

Some other embodiments are directed to identifying when a passenger terminal has been left onboard the vehicle and taking responsive actions to notify a crew member of the presence of the passenger terminal and the name of the associated passenger. Locating the abandoned passenger terminal may be performed as a passenger service and/or may be performed as a flight safety issue to prevent a possible terrorist act using that terminal.

Figure 17:
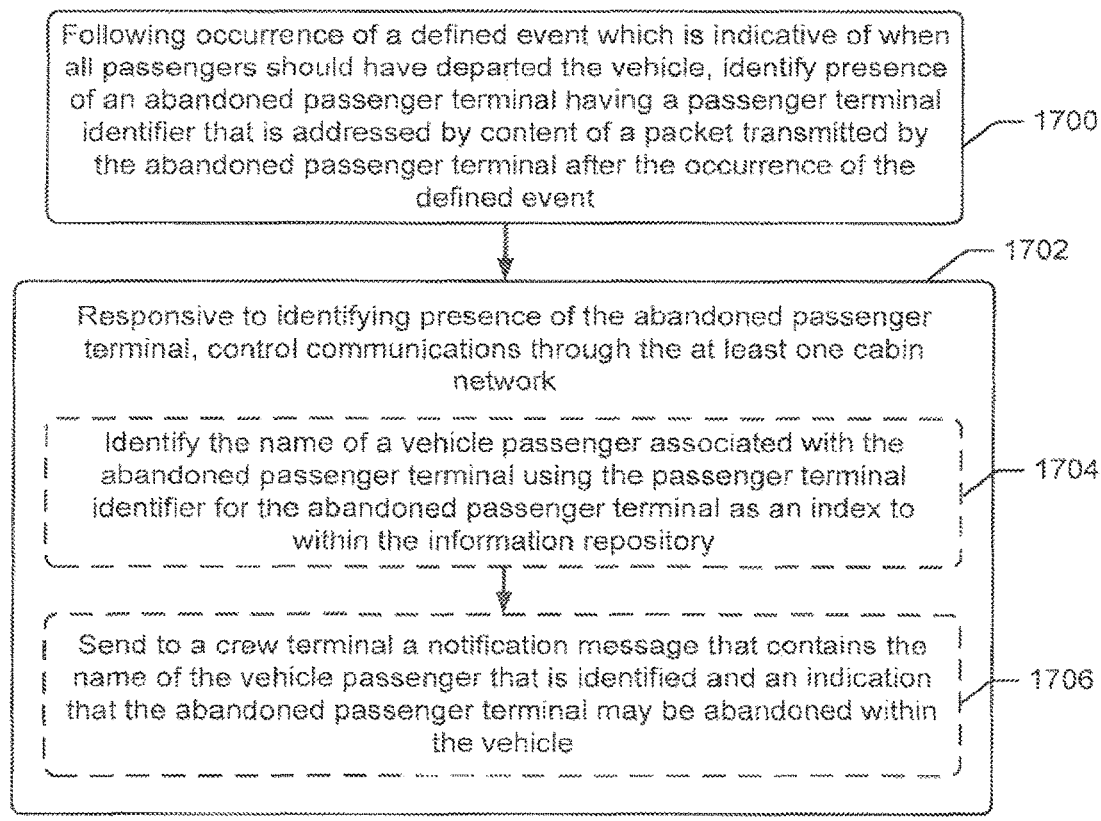

Referring to the operational embodiment of FIG. 17, the network analysis terminal 150 can determine that a defined event has occurred which is indicative of when all passengers should have departed the vehicle cabin 100, and responsively identify (block 1700) presence of an abandoned passenger terminal 130 having a passenger terminal identifier that is addressed by content of a packet transmitted by the abandoned passenger terminal 130 after the occurrence of the defined event. The network analysis terminal 150 may respond to identifying presence of the abandoned passenger terminal 130 by controlling (block 1702) communications through the cabin network 300. In one embodiment, the network analysis terminal 150 identifies (block 1704) the name of a vehicle passenger associated with the abandoned passenger terminal 130 using the passenger terminal identifier for the abandoned passenger terminal 130 as an index to within the information repository 156, and sends (block 1706) to a crew terminal a notification message that contains the name of the vehicle passenger that is identified and an indication that the abandoned passenger terminal 130 may be abandoned within the vehicle cabin 100.

In a further embodiment relating to FIG. 17, the network analysis terminal 150 generates a listing of the passenger terminal identifiers which are addressed by content of the packets received by the network interface during travel by the vehicle. Following occurrence of the defined event, the network analysis terminal 150 identifies a passenger terminal identifier of the abandoned passenger terminal 130 that is addressed by content of a packet transmitted by the abandoned passenger terminal 130 after the occurrence of the defined event and that is contained in the listing of the passenger terminal identifiers generated during the travel by the vehicle. These additional steps may serve to generate notifications only when the abandoned passenger terminal was present onboard during an earlier flight leg, while ignoring presence of a passenger terminal that has been newly carried onboard perhaps in preparation for an upcoming flight leg.

Some other embodiments are directed to identifying when a passenger terminal is operating as a wireless access point advertising to other passenger terminals a network connection service to the cabin network 300. A passenger terminal may be operated in this manner to improperly monitor communications by other passenger terminals for purposes of gathering confidential information (e.g., eCommerce account login credentials, credit card information, etc.) that can be used for fraudulent activities.

Figure 18:
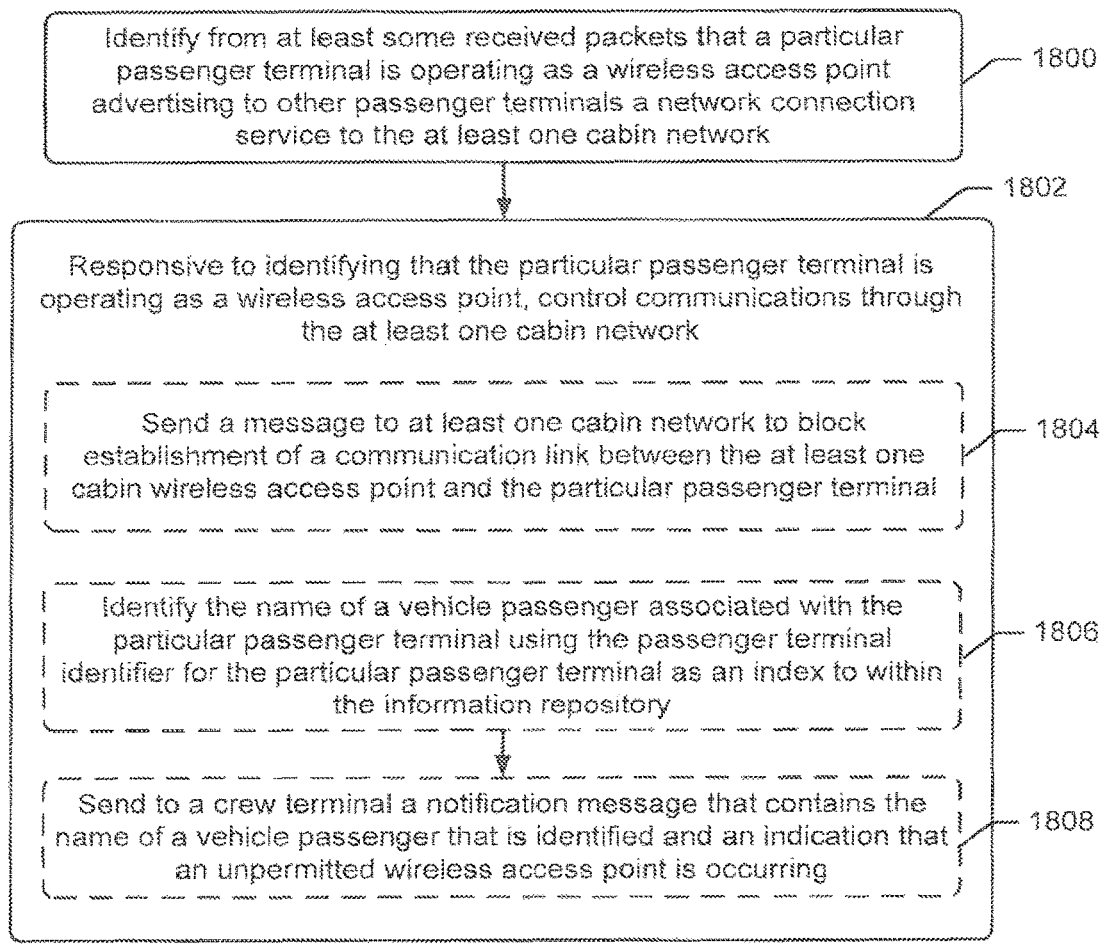

Referring to the operational embodiment of FIG. 18, when generating the connectivity metrics the network analysis terminal 150 can identify (block 1800) from at least some received packets that a particular one of passenger terminals 130 is operating as a wireless access point advertising to other passenger terminals 130 a network connection service to the cabin network 300. The network analysis terminal 150 responds to identifying that the particular passenger terminal 130 is operating as a wireless access point, by controlling (block 1802) communications through the cabin network 300.

The network analysis terminal 150 may respond by sending (block 1804) a message to the cabin network 300 to block establishment of a communication link between a CWAP 110 and the particular passenger terminal 130. Sending of the message may be triggered responsive to the terminal 150 identifying that the particular passenger terminal 130 is advertising a service set identifier (SSID) that matches an SSID advertised by the CWAP 110. Thus, when a passenger terminal 130 is clearly imitating a CWAP of the cabin network 300 the crew can be notified and communications with that passenger terminal can be blocked.

Alternatively or additionally, the network analysis terminal 150 may respond (block 1802) to identifying that the particular passenger terminal 130 is operating as a wireless access point, by identifying (block 1806) the name of a vehicle passenger associated with the particular passenger terminal 130 using the passenger terminal identifier for the particular passenger terminal 130 as an index to within the information repository 156, and sending (block 1808) to a crew terminal a notification message that contains the name of a vehicle passenger that is identified and an indication that an unpermitted wireless access point is occurring.

In a further related embodiment to FIG. 18, when generating connectivity metrics the network analysis terminal 150 can control each of the CWAPs 110 to measure and report to the network analysis terminal 150 a direction which the particular passenger terminal is located relative to the CWAP 110. The CWAPs 110 may each determine the direction based on comparing strengths of signals and/or relative time-of-arrival of signals received by multiple antennas of the CWAP from the passenger terminal. The network analysis terminal 150 receives the directions reported by the CWAPs 110, estimates a location of the particular passenger terminal within the cabin responsive to the directions reported by the CWAPs 110. The location may, for example, be identified as a direction from one or more of the CWAPs 110 installed within the cabin and/or may be identified as a direction and/or distance relative to one or more of the CWAPs 110 and/or one or more seats within the cabin using a repository of information, which defines the locations of the CWAPs 110 relative to the cabin and/or defines the locations of the CWAPs 110 relative to the seats. The operations for sending the notification to a crew terminal can include generating the notification message to contain the estimated location of the particular passenger terminal 130 within the cabin, the name of a vehicle passenger that is identified, and the indication that an unpermitted wireless access point is occurring.

Some other embodiments are directed to identifying when a passenger terminal is performing peer-to-peer communications, e.g., WiFi direct, with another one of the passenger terminals. A passenger terminal may be operated in this manner to circumvent monitoring by devices that are part of or are connected through the cabin network 300. For example, passengers conspiring to commit a terrorist act on the vehicle may use peer-to-peer communications to confidentially plan such act. Peer-to-peer communications can also be disruptive to the operation of the cabin network 300 in view of their potential competition for and interference with the same scarce radio resources (e.g., operational radio frequencies) that used by the CWAPs 110 to communicate within the cabin.

Figure 19:
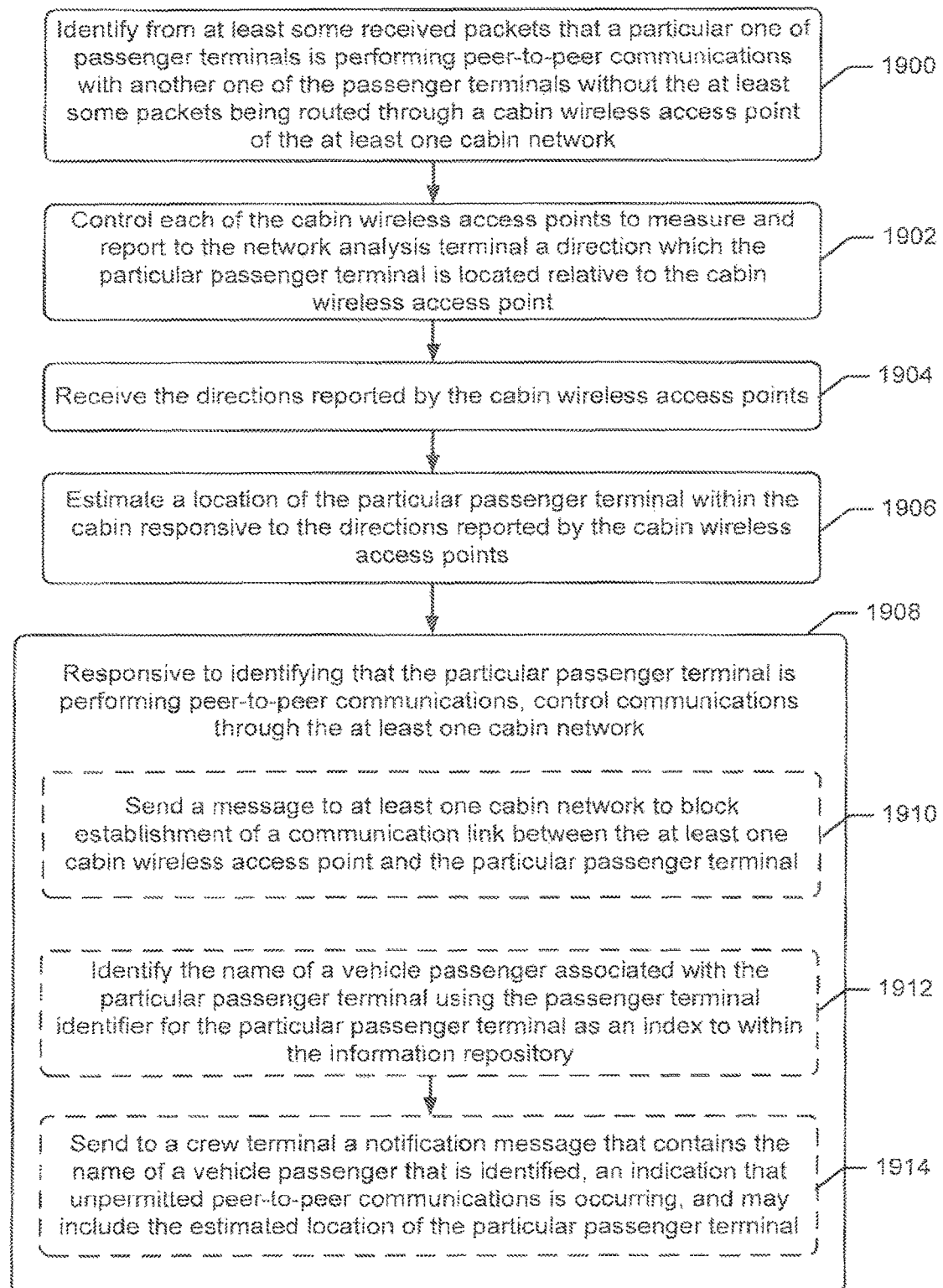

Referring to the operational embodiment of FIG. 19, when generating connectivity metrics the network analysis terminal 150 can identify (block 1900) from at least some received packets that a particular one of the passenger terminals 130 is performing peer-to-peer communications with another one of the passenger terminals 130 without the at least some packets being routed through a CWAP 110 of the cabin network 300. The network analysis terminal 150 responds to identifying that the particular passenger terminal 130 is performing peer-to-peer communications, by controlling (block 1908) communications through the cabin network 300.

When controlling (block 1908) communications through the cabin network 300, the network analysis terminal 150 may send a message to a CWAP 110 to block establishment of a communication link between the CWAP 110 and the particular passenger terminal 130. Alternatively or additionally, the network analysis terminal 150 may responsively identify (block 1912) the name of a vehicle passenger associated with the particular passenger terminal 130 using the passenger terminal identifier for the particular passenger terminals 130 as an index to within the information repository 156, and send (block 1914) to a crew terminal a notification message that contains the name of a vehicle passenger that is identified and an indication that unpermitted peer-to-peer communications is occurring.

The network analysis terminal 150 may control (block 1902) each of the CWAPs 110 to measure and report to the network analysis terminal 150 a direction which the particular passenger terminal 130 is located relative to the CWAP 110. The directions reported by the CWAPs 110 are received (block 1904), and a location of the particular passenger terminal 130 within the cabin is estimated (block 1906) responsive to the directions reported by the CWAPs 110. The network analysis terminal 150 may then generate the notification message to contain the estimated location of the particular passenger terminal 130 within the cabin, the name of a vehicle passenger that is identified, and the indication that the unpermitted peer-to-peer communications is occurring.

Some other embodiments are directed to a network analysis terminal providing a listing of the passenger names to an onboard or off-board registry that can determine whether one of the passengers is a potential problem and, if so, can trigger notification to a crew member and/or block or otherwise control access to the cabin network. A passenger may, for example, be identified as on a no-fly list and who should not be present on the aircraft, identified as having an outstanding arrest warrant, identified as having caused problems during an earlier flight, and/or another defined reason.

Figure 20:
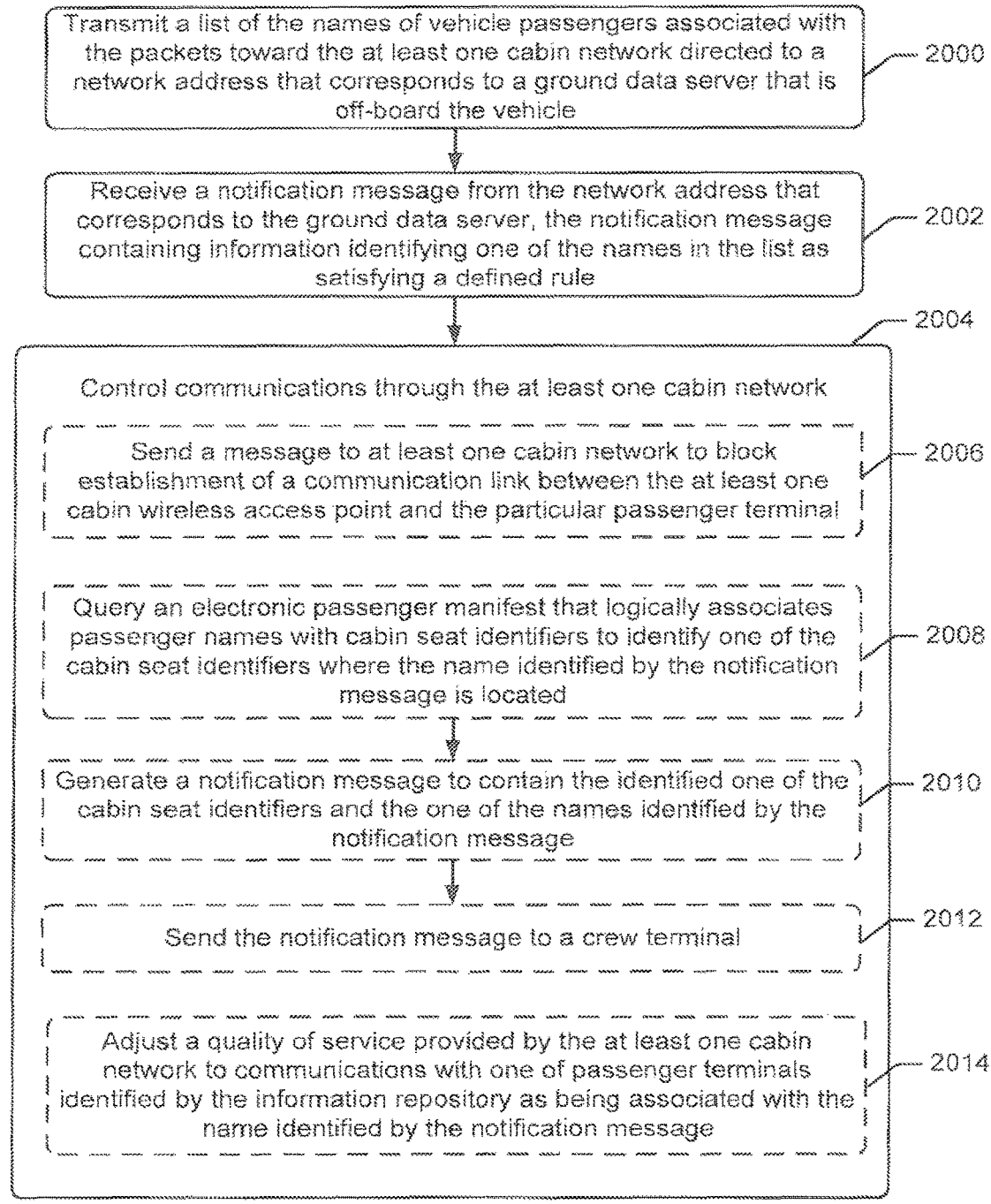

Referring to the embodiments of FIG. 20, the network analysis terminal 150 transmits (block 2000) a list of the names of vehicle passengers, which have been identified as being associated with the packets, in a message toward the cabin network 300. The message is directed to a network address that corresponds to a ground data server that is off-board the vehicle. Network analysis terminal 150 subsequently receives (block 2002 a notification message from the network address that corresponds to the ground data server. The notification message contains information identifying one of the names in the list as satisfying a defined rule. The network analysis terminal 150 responsively controls (block 2004) communications through the cabin network 300 by the passenger terminal 130 that is associated with the identified passenger.

In one related embodiment, responsive to the content of the notification message the network analysis terminal 150 sends (block 2006) a message to one or more of the CWAPs 110 to block establishment of a communication link to one of passenger terminals 130 which is identified by the information repository as being associated with the one of the names identified by the notification message.

In another related embodiment, responsive to the content of the notification message the network analysis terminal 150 queries (block 2008) an electronic passenger manifest, e.g., the repository 162, that logically associates passenger names with cabin seat identifiers to identify one of the cabin seat identifiers where the one of the names identified by the notification message is located. A notification message is generated (block 2010) to contain the identified one of the cabin seat identifiers and the one of the names identified by the notification message, and is sent (block 2012) to a crew terminal.

In another related embodiment, responsive to the content of the notification message the network analysis terminal 150 adjust (block 2014) a quality of service provided by the cabin network 300 to communications with one of passenger terminals identified by the information repository as being associated with the one of the names identified by the notification message. When the identified name is associated with a prioritized customer, e.g., a traveler having a defined customer tier status, a corresponding higher tier quality of service can be provided to the passenger terminal 130 that has been identified as being associated with the identified name. The quality of service that is controlled may include, but is not limited to, communication bandwidth limitation, allowed packet jitter rate, packet delivery delay limitation, packet delivery prioritization, etc.

Some other embodiments are directed to operating a network analysis terminal to map signal measurements of CWAPs 110 to locations within the cabin, and identify when changes occur over time in those measurements such that a notification message is sent to a crew terminal. The crew terminal may reside onboard the vehicle or may be off-for the vehicle but communicatively connected to the cabin network 300 through a wireless communication link.

Figure 21:
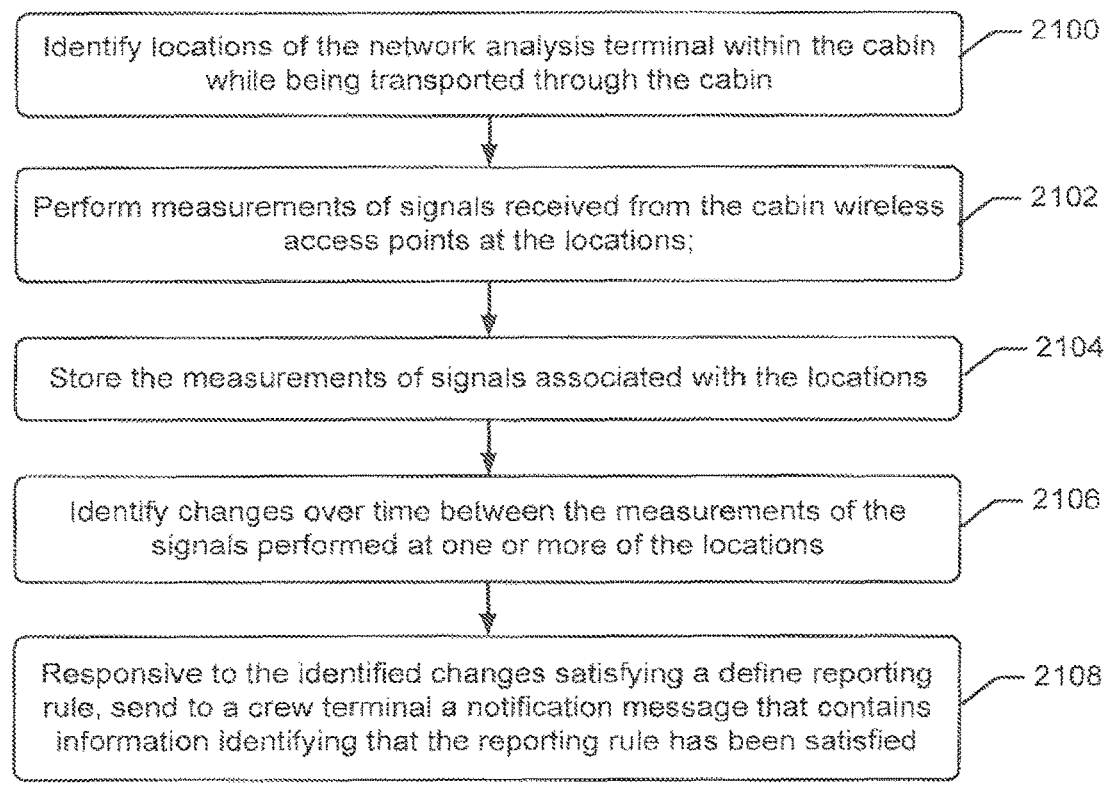

Referring to the embodiments of FIG. 21, the network analysis terminal 150 can be a mobile communication terminal is transportable through the vehicle cabin 100, such as along an aisle and between rows of seats. The network analysis terminal 150 operates to identify (block 2100) its location within the cabin while being transported through the cabin, performs (block 2102) measurements of signals received from the CWAPs 110 at the locations, and stores (block 2104) in a memory device the measurements of signals associated with the locations. Over time the network analysis terminal 150 identifies when the measurements of the signals performed at one or more of the locations has changed such that a defined reporting rule has become satisfied. Responsive to the rule being satisfied the network analysis terminal 150 sends (block 2108) to a crew terminal a notification message that contains information identifying that the reporting rule has been satisfied.

The locations of the network analysis terminal 150 within the cabin may be determined by the terminal 150 containing a GPS receiver that determines GPS based locations while being transported through the cabin. The network analysis terminal 150 can compute a pathway along which the network analysis terminal was transported through the cabin. When sending the notification message to a crew terminal, the network analysis terminal 150 can generate the notification message to include an indication of a location along the pathway where the reporting rule became satisfied. The crew member can thereby identify where within the cabin a signal quality problem is occurring, which may assist with determining what remedial action, if any, should be taken. The remedial action using this location may include identifying which one or more antennas of one or more of the CWAPs 110 should be adjusted to attempt to remedy the signal quality problem at the defined location along the pathway.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A network analysis terminal in communication with wireless access points, the network analysis terminal comprising:
 a network interface configured to monitor packets communicated through the wireless access points of at least one network between a content server and user terminals;
 a processor connected to receive packets monitored by the network interface; and
 a memory connected to the processor and storing computer readable program code executed by the processor to perform operations comprising:
  identifying user terminal identifiers from content of the packets comprising a network address of the user terminals;
  identifying names of users associated with the packets using the user terminal identifiers as indexes to retrieve the names of users from an information repository that maps names of users to user terminal identifiers;
  generating connectivity metrics based on measurements performed on the packets over time and the identified names of the users; and
  blocking establishment of communications between the wireless access points of the at least one network and the user terminals based on the connectivity metrics.

2. The network analysis terminal of claim 1, wherein:
 the wireless access points are attached at spaced apart locations of a structure and are communicatively connected to the content server;
 the operations for generating connectivity metrics, further comprise:
  identifying occurrences of at least a threshold level of interference by an interfering user terminal to communications between the wireless access points and the user terminals;
  controlling each of the wireless access points to measure and report to the network analysis terminal a direction which the interfering user terminal is located relative to the wireless access point;
  receiving the directions reported by the wireless access points; and
  estimating a location of the interfering user terminal responsive to the directions reported by the wireless access points; and
 the operations for blocking establishment of communications between the wireless access points of the at least one network and the user terminals based on the connectivity metrics, comprise
  sending to an operator terminal a notification message that contains the estimated location of the interfering user terminal and an indication that excessive interference by the interfering user terminal to the wireless access points is occurring.

3. The network analysis terminal of claim 2, wherein the operations for blocking establishment of communications between the wireless access points of the at least one network and the user terminals based on the connectivity metrics, further comprise:
  sending a message to the wireless access points to block establishment of a communication link to the interfering user terminal.

4. The network analysis terminal of claim 1, wherein:
  the wireless access points are attached to spaced apart locations along a structure and are communicatively connected to the content server;
  the operations for generating connectivity metrics, further comprise:
    controlling each of the wireless access points to measure and report to the network analysis terminal an interference signal strength of a signal received from an interfering user terminal that interferes with communications between the wireless access point and user terminals; and
  the operations for blocking establishment of communications through the at least one network based on the connectivity metrics, comprise
    responsive to the interference signal strengths received from the wireless access points satisfying a defined remedial action rule, sending a message to the wireless access points to block establishment of a communication link to the interfering user terminal.

5. The network analysis terminal of claim 1, wherein:
  the wireless access points are attached to spaced apart locations along a structure and are communicatively connected to the content server;
  the operations for generating connectivity metrics, further comprise:
    controlling each of the wireless access points to measure and report to the network analysis terminal an interference signal strength of a signal received from an interfering user terminal that interferes with communications between the wireless access point and user terminals; and
  the operations for blocking establishment of communications between the wireless access points of the at least one network and the user terminals based on the connectivity metrics, comprise
    responsive to the interference signal strengths received from the wireless access points satisfying a defined remedial action rule,
      identifying the name of a user associated with the interfering user terminal using the user terminal identifier for the interfering user terminal as an index to within the information repository, and
      sending to an operator terminal a notification message that contains the name of a user that is identified and an indication that excessive interference by the interfering user terminal to the wireless access points is occurring.

6. The network analysis terminal of claim 1, the operations further comprising:
  following occurrence of a defined event which is indicative of when all users should have departed a defined user space, identifying presence of an abandoned user terminal having a user terminal identifier that is addressed by content of a packet transmitted by the abandoned user terminal after the occurrence of the defined event,
  wherein the operations for blocking establishment of communications between the wireless access points of the at least one network and the user terminals based on the connectivity metrics, comprise
    responsive to identifying presence of the abandoned user terminal,
      identifying the name of a user associated with the abandoned user terminal using the user terminal identifier for the abandoned user terminal as an index to within the information repository, and
      sending to an operator terminal a notification message that contains the name of the user that is identified and an indication that the abandoned user terminal may be abandoned within the defined user space.

7. The network analysis terminal of claim 6, wherein the identifying presence of an abandoned user terminal having a user terminal identifier that is addressed by content of a packet transmitted by the abandoned user terminal after the occurrence of the defined event, comprises:
  generating a listing of the user terminal identifiers which are addressed by content of the packets received by the network interface during occupation of the defined user space by users; and
  following occurrence of the defined event, identifying a user terminal identifier of the abandoned user terminal that is addressed by content of a packet transmitted by the abandoned user terminal after the occurrence of the defined event and that is contained in the listing of the user terminal identifiers generated during the occupation of the defined user space by users.

8. The network analysis terminal of claim 1, wherein:
  the operations for generating connectivity metrics, comprise identifying from at least some received packets that a particular one of user terminals is operating as a wireless access point advertising to other user terminals a network connection service to the at least one network; and
  the operations for blocking establishment of communications between the wireless access points of the at least one network and the user terminals based on the connectivity metrics, comprise:
    responsive to identifying that the particular one of user terminals is operating as a wireless access point, sending a message to the at least one network to block establishment of a communication link between a wireless access point and the particular one of user terminals.

9. The network analysis terminal of claim 8, wherein the operations for sending a message to at least one network to block establishment of a communication link between the wireless access point and the particular one of user terminals, further comprise:
  identifying that the particular one of user terminals is advertising a service set identifier (SSID) that matches an SSID advertised by the wireless access point; and
  responding to identifying that the particular one of user terminals is operating as a wireless access point and that the particular one of the user terminals is advertising the SSID that matches the SSID advertised by the wireless access point, by sending the message to the wireless access point to block establishment of a communication link with the particular one of user terminals.

10. The network analysis terminal of claim 1, wherein:
  the operations for generating connectivity metrics, comprise identifying from at least some received packets that a particular one of user terminals is operating as a wireless access point advertising to other user terminals a network connection service to the at least one network; and the operations for blocking establishment of communications between the wireless access points of the at least one network and the user terminals based on the connectivity metrics, comprise:

responsive to identifying that the particular one of user terminals is operating as a wireless access point, identifying the name of a user associated with the particular one of user terminals using the user terminal identifier for the particular one of user terminals as an index to within the information repository, and sending to an operator terminal a notification message that contains the name of a user that is identified and an indication that an unpermitted wireless access point is occurring.

11. The network analysis terminal of claim 10, wherein:

the wireless access points are attached at spaced apart locations along a structure and are communicatively connected to the content server;

the operations for generating connectivity metrics, further comprise:

controlling each of the wireless access points to measure and report to the network analysis terminal a direction which the particular one of user terminals is located relative to the wireless access point;

receiving the directions reported by the wireless access points; and estimating a location of the particular one of user terminals responsive to the directions reported by the wireless access points; and the operations for sending to an operator terminal a notification message that contains the name of a user that is identified and an indication that an unpermitted wireless access point is occurring, comprise generating the notification message to contain the estimated location of the particular one of user terminals, the name of a user that is identified, and the indication that an unpermitted wireless access point is occurring.

12. The network analysis terminal of claim 1, wherein:

the operations for generating connectivity metrics, comprise identifying from at least some received packets that a particular one of user terminals is performing peer-to-peer communications with another one of the user terminals without the at least some packets being routed through a wireless access point of the at least one network; and the operations for blocking establishment of communications between the wireless access points of the at least one network and the user terminals based on the connectivity metrics, comprise:

responsive to identifying that the particular one of user terminals is performing peer-to-peer communications, sending a message to a wireless access point to block establishment of a communication link between the wireless access point and the particular one of user terminals.

13. The network analysis terminal of claim 1, wherein:

the operations for generating connectivity metrics, comprise identifying from at least some received packets that a particular one of user terminals is performing peer-to-peer communications with another one of the user terminals without the at least some packets being routed through a wireless access point of the at least one network; and the operations for blocking establishment of communications between the wireless access points of the at least one network and the user terminals based on the connectivity metrics, comprise:

responsive to identifying that the particular one of user terminals is performing peer-to-peer communications, identifying the name of a user associated with the particular one of user terminals using the user terminal identifier for the particular one of user terminals as an index to within the information repository, and sending to an operator terminal a notification message that contains the name of a user that is identified and an indication that unpermitted peer-to-peer communications is occurring.

14. The network analysis terminal of claim 13, wherein:

the wireless access points are attached at spaced apart locations along a structure and are communicatively connected to the content server;

the operations for generating connectivity metrics, further comprise:

controlling each of the wireless access points to measure and report to the network analysis terminal a direction which the particular one of user terminals is located relative to the wireless access point;

receiving the directions reported by the wireless access points; and estimating a location of the particular one of user terminals responsive to the directions reported by the wireless access points; and the operations for sending to an operator terminal a notification message that contains the name of a user that is identified and an indication that unpermitted peer-to-peer communications is occurring, comprise generating the notification message to contain the estimated location of the particular one of user terminals, the name of a user that is identified, and the indication that the unpermitted peer-to-peer communications is occurring.

15. The network analysis terminal of claim 1, the operations further comprising:

transmitting a list of the names of users associated with the packets toward the at least one network directed to a network address that corresponds to a ground data server;

receiving a notification message from the network address that corresponds to the ground data server, the notification message containing information identifying one of the names in the list as satisfying a defined rule; and responsive to the content of the notification message, sending to an operator terminal a notification message that contains the one of the names identified by the notification message.

16. The network analysis terminal of claim 15, the operations further comprising:

responsive to the content of the notification message, querying an electronic user manifest that logically associates user names with seat identifiers to identify one of the seat identifiers where the one of the names identified by the notification message is located; and generating the notification message to contain the identified one of the seat identifiers and the one of the names identified by the notification message.

17. The network analysis terminal of claim 1, the operations further comprising:
- transmitting a list of the names of users associated with the packets toward the at least one network directed to a network address that corresponds to a ground data server;
- receiving a notification message from the network address that corresponds to the ground data server, the notification message containing information identifying one of the names in the list as satisfying a defined rule; and
- responsive to the content of the notification message, sending a message to the at least one network to block establishment of a communication link to one of user terminals identified by the information repository as being associated with the one of the names identified by the notification message.

18. The network analysis terminal of claim 1, the operations further comprise:
- transmitting a list of the names of users associated with the packets toward the at least one network directed to a network address that corresponds to a ground data server;
- receiving a notification message from the network address that corresponds to the ground data server, the notification message containing information identifying one of the names in the list as satisfying a defined rule; and
- responsive to the content of the notification message, adjusting a quality of service provided by the at least one network to communications with one of user terminals identified by the information repository as being associated with the one of the names identified by the notification message.

19. The network analysis terminal of claim 1,
- wherein the wireless access points are attached at spaced apart locations along a structure of a defined user space and are communicatively connected to the content server;
- wherein the network analysis terminal comprises a mobile communication terminal; and
- the operations further comprise:
  - identifying locations of the network analysis terminal during occupation of the defined user space by users;
  - performing measurements of signals received from the wireless access points at the locations;
  - storing the measurements of signals associated with the locations;
  - identifying changes over time between the measurements of the signals performed at one or more of the locations; and
  - responsive to the identified changes satisfying a defined reporting rule, sending to an operator terminal a notification message that contains information identifying that the reporting rule has been satisfied.

20. The network analysis terminal of claim 19, wherein:
- the operations to identify locations of the network analysis terminal, comprise obtaining GPS locations of the network analysis terminal during occupation of the defined user space by users, and computing a pathway along which the network analysis terminal was transported by a user through the defined user space; and
- the operations to send to an operator terminal a notification message, comprises generating the notification message to include an indication of a location along the pathway where the reporting rule became satisfied.

21. A method by a network analysis terminal in communication with wireless access points, the method comprising:
- monitoring packets communicated through the wireless access points of at least one network between a content server and user terminals;
- identifying user terminal identifiers from content of the packets comprising a network address of the user terminals;
- identifying names of users associated with the packets using the user terminal identifiers as indexes to retrieve the names of users from an information repository that maps names of users to user terminal identifiers;
- generating connectivity metrics based on measurements performed on the packets over time; and
- blocking establishment of communications between the wireless access points of the at least one network and the user terminals based on the connectivity metrics.

* * * * *